US009286276B2

(12) United States Patent
Cairns et al.

(10) Patent No.: US 9,286,276 B2
(45) Date of Patent: Mar. 15, 2016

(54) SYSTEM AND METHOD OF DOCUMENT EMBEDDING IN COLLABORATIVE EDITORS

(75) Inventors: Brian Lewis Cairns, Boulder, CO (US); John Day-Richter, Denver, CO (US)

(73) Assignee: Google Inc., Mountain View, CA (US)

( * ) Notice: Subject to any disclaimer, the term of this patent is extended or adjusted under 35 U.S.C. 154(b) by 653 days.

(21) Appl. No.: 13/493,672

(22) Filed: Jun. 11, 2012

(65) Prior Publication Data

US 2015/0199316 A1    Jul. 16, 2015

(51) Int. Cl.
*G06F 17/24* (2006.01)
*G06F 17/22* (2006.01)
*H04L 29/08* (2006.01)
*G06F 15/16* (2006.01)

(52) U.S. Cl.
CPC ............ *G06F 17/24* (2013.01); *G06F 17/2229* (2013.01); *G06F 17/2235* (2013.01); *G06F 17/2247* (2013.01); *H04L 67/02* (2013.01)

(58) Field of Classification Search
CPC .... G06F 17/218; G06F 17/24; G06F 17/2288
USPC .......................................................... 715/234
See application file for complete search history.

(56) References Cited

U.S. PATENT DOCUMENTS

| | | | | |
|---|---|---|---|---|
| 5,528,743 A * | 6/1996 | Tou | ........................ | G06F 17/25 345/179 |
| 5,930,813 A * | 7/1999 | Padgett | .................... | G06T 11/60 715/205 |
| 6,006,239 A * | 12/1999 | Bhansali | ............... | G06F 17/246 |
| 6,031,989 A * | 2/2000 | Cordell | ......................... | 717/109 |
| 6,169,999 B1 * | 1/2001 | Kanno | ................ | G06F 17/2735 704/10 |
| 6,377,354 B1 * | 4/2002 | Nguyen | ................. | G06K 15/02 358/1.11 |
| 6,377,993 B1 * | 4/2002 | Brandt | ................ | G06F 11/0709 707/E17.107 |
| 6,512,531 B1 * | 1/2003 | Gartland | ............... | G06F 17/214 345/467 |
| 6,879,997 B1 * | 4/2005 | Ketola | .................... | H04W 4/12 455/517 |
| 6,972,748 B1 * | 12/2005 | Lang | ..................... | G06F 3/0234 341/22 |
| 7,009,626 B2 * | 3/2006 | Anwar | .................. | G06F 3/1203 345/660 |
| 7,577,752 B2 * | 8/2009 | Kimura | ......................... | 709/232 |
| 7,624,145 B2 * | 11/2009 | Junuzovic | ........... | H04L 67/1095 707/999.001 |
| 7,712,016 B2 * | 5/2010 | Jones | ..................... | G06F 17/24 715/200 |
| 7,792,788 B2 * | 9/2010 | Melmon | ............. | H04L 67/1095 707/608 |
| 7,953,696 B2 * | 5/2011 | Davis | ................ | G06F 17/30908 707/608 |

(Continued)

OTHER PUBLICATIONS

Googlepedia: The Ultimate Google Resource, Third Edition, 2008.

(Continued)

*Primary Examiner* — Scott Baderman
*Assistant Examiner* — Mario M Velez-Lopez
(74) *Attorney, Agent, or Firm* — Ropes & Gray LLP

(57) ABSTRACT

A device embeds a first frame in a second frame. A first mutation defining a first change made to a document within the first frame is generated. A second mutation defining a second change made to the document within the second frame is generated. The first mutation and a first embed identifier assigned to the first mutation and the second mutation and a second embed identifier assigned to the second mutation are transmitted to a remote server. A first instruction relating to the document and including the first embed identifier and a second instruction relating to the document and including the second embed identifier are received from the remote server. The first instruction, based on the first embed identifier, is transmitted by the device to the first frame. The second instruction, based on the second embed identifier, is transmitted by the device to the second frame.

24 Claims, 16 Drawing Sheets

(56) References Cited

U.S. PATENT DOCUMENTS

| | | | | |
|---|---|---|---|---|
| 7,958,448 | B2* | 6/2011 | Fattic, II | G06F 17/214 715/269 |
| 8,044,961 | B2* | 10/2011 | Opstad | G06F 17/214 345/467 |
| 8,065,604 | B2* | 11/2011 | Blankinship | G06F 17/30038 715/229 |
| 8,209,706 | B2* | 6/2012 | Corvera et al. | 719/315 |
| 8,281,023 | B2* | 10/2012 | Dondeti | H04L 67/1076 709/227 |
| 8,453,112 | B1* | 5/2013 | Brambley et al. | 717/110 |
| 8,484,561 | B1* | 7/2013 | Lemonik et al. | 715/255 |
| 8,505,106 | B1* | 8/2013 | Bhosle et al. | 726/28 |
| 8,522,134 | B1* | 8/2013 | Zetlen | 715/235 |
| 2002/0162118 | A1* | 10/2002 | Levy | H04N 7/088 725/110 |
| 2002/0174224 | A1* | 11/2002 | Scheifler | G06F 9/4411 709/225 |
| 2003/0115268 | A1* | 6/2003 | Esposito | G06F 17/30371 709/205 |
| 2003/0179230 | A1* | 9/2003 | Seidman | G06F 3/1454 715/750 |
| 2004/0015781 | A1* | 1/2004 | Brown | G06Q 30/0283 715/209 |
| 2004/0210536 | A1* | 10/2004 | Gudelj et al. | 705/64 |
| 2005/0234943 | A1* | 10/2005 | Clarke | H04L 67/38 |
| 2006/0248442 | A1* | 11/2006 | Rosenstein et al. | 715/501.1 |
| 2007/0094601 | A1* | 4/2007 | Greenberg | G06Q 10/10 715/713 |
| 2007/0106956 | A1* | 5/2007 | Platt et al. | 715/808 |
| 2007/0233811 | A1* | 10/2007 | Rochelle | G06F 17/246 709/219 |
| 2007/0239695 | A1* | 10/2007 | Chakra | G06F 17/30165 |
| 2007/0299857 | A1* | 12/2007 | Gwozdz et al. | 707/102 |
| 2008/0120538 | A1* | 5/2008 | Kurz et al. | 715/255 |
| 2008/0209311 | A1* | 8/2008 | Agronik et al. | 715/234 |
| 2008/0298342 | A1* | 12/2008 | Appleton et al. | 370/351 |
| 2009/0083707 | A1* | 3/2009 | Fujita et al. | 717/115 |
| 2009/0192845 | A1* | 7/2009 | Gudipaty | G06Q 10/1095 705/7.19 |
| 2010/0153948 | A1* | 6/2010 | Schreiber | G06F 9/455 718/1 |
| 2010/0241749 | A1* | 9/2010 | Rasmussen | G06Q 10/107 709/226 |
| 2010/0293461 | A1* | 11/2010 | Boezeman et al. | 715/708 |
| 2011/0178981 | A1* | 7/2011 | Bowen | G06Q 10/00 707/608 |
| 2011/0252312 | A1* | 10/2011 | Lemonik et al. | 715/255 |
| 2011/0302237 | A1* | 12/2011 | Knight et al. | 709/203 |
| 2012/0072819 | A1* | 3/2012 | Lindner | G06F 3/0485 715/211 |
| 2012/0331488 | A1* | 12/2012 | Marathe et al. | 719/331 |
| 2013/0131840 | A1* | 5/2013 | Govindaraj et al. | 700/19 |
| 2013/0198734 | A1* | 8/2013 | Biswas et al. | 717/174 |
| 2014/0047413 | A1* | 2/2014 | Sheive et al. | 717/110 |

OTHER PUBLICATIONS

Conner, Zoho 4 Everyone, 2008.

Lemonik et al., System and Method for Using a Third-Party Add-On in a Collaborative Online Software Development Environment, unpublished U.S. Appl. No. 13/551,859, filed Jul. 18, 2012, pp. 1-103.

Lemonik et al., System and Method for Using a Third-System and Method for Using a Third-Party Add-On to Manipulate a Document in a Collaborative Online Software Development Environment, unpublished U.S. Appl. No. 13/551,772, filed Jul. 18, 2012, pp. 1-119.

Day-Richter et al., System and Method for Performing Data Management in a Collaborative Development Environment, unpublished U.S. Appl. No. 13/591,734, filed Aug. 22, 2012, pp. 1-101.

Day-Richter et al., System and Method for Managing Remote Procedure Calls Relating to a Third Party Software Application, unpublished U.S. Appl. No. 13/591,851, filed Aug. 22, 2012, pp. 1-98.

Unpublished U.S. Appl. No. 13/006,259, filed Jan. 13, 2011.
Unpublished U.S. Appl. No. 13/166,844, filed Jun. 23, 2011.
Unpublished U.S. Appl. No. 13/224,479, filed Sep. 2, 2011.
Unpublished U.S. Appl. No. 13/224,530, filed Sep. 2, 2011.
Unpublished U.S. Appl. No. 13/224,573, filed Sep. 2, 2011.
Unpublished U.S. Appl. No. 13/224,663, filed Sep. 2, 2011.
Unpublished U.S. Appl. No. 13/224,769, filed Sep. 2, 2011.
Unpublished U.S. Appl. No. 13/224,860, filed Sep. 2, 2011.
Unpublished U.S. Appl. No. 13/297,762, filed Nov. 16, 2011.
Unpublished U.S. Appl. No. 13/274,382, filed Oct. 17, 2011.
Unpublished U.S. Appl. No. 13/282,636, filed Oct. 17, 2011.
Unpublished U.S. Appl. No. 13/282,753, filed Oct. 27, 2011.
Unpublished U.S. Appl. No. 13/493,798, filed Jun. 11, 2012.

Citro, Sandy, "Conflict Management for Real-Time Collaborative Editing in Mobile Replicated Architectures," 2007, Australian Computer Society, Inc., Thirteenth Austrailian Computer Science Conference (ACSC2007), pp. 115-124.

DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www.computerworld.com/s/article/print/9108799/Online_office_apps_get_real_Google_Docs_vs_ThinkFree_vs._Zoho> (7 pp.).

Miller, Michael, "Googlepedia: The Ultimate Google Resource, Third edition," 2008, p. 276.

Olav Junker Kjaer, "Timing and Synchronization in JavaScript", Dev. Opera, Sections: "The Basics", "Event Queing", "Long Running Scripts" and "Advice on Timing", Feb. 27, 2007, downloaded from URL: htt//dev.opera.com/articles/view/timing-and-synchronization-in-javascript/, pp. 1-9.

PCT International Search Report corresponding to PCT Application No. PCT/US2011/001417 filed Aug. 11, 2011 (2 pages).

PCT Written Opinion of the International Searching Authority corresponding to PCT Application No. PCT/US2011/001417 filed Aug. 11, 2011 (7 pages).

Quinn, Laura S., "Comparing Online vs. Traditional Office Software, Will desktop or online office software fit your non-profit needs best?" May 21, 2010, courtesy of Idealware, TechSoup.org [online]. Retrieved from the Internet URL:http://www.techsoup.org/learningcenter/software/page11852.cfm (4 pp.).

Tyson, Herb, "Microsoft Word 2007 Bible," 2007, 112-115, 467, 523-525, 798.

Wikipedia, the free encyclopedia, "Model-View-Controller," last modified on Nov. 16, 2010 [online]. Retrieved from the Internet: URL:http://en.wikipedia.org/wiki/Model%E2%80%93view%E2%80%93controller (10 pp.).

Sun, "Operational Transformation in Real-Time Group Editors: Issues, Algorithms, and Achievements," Conference on Computer-Supported Cooperative Work, 1988.

* cited by examiner

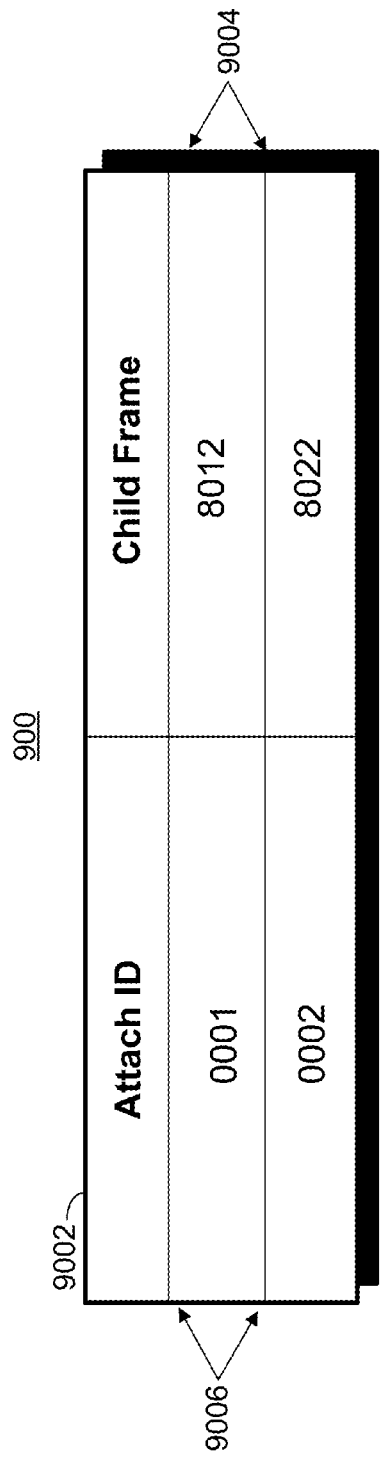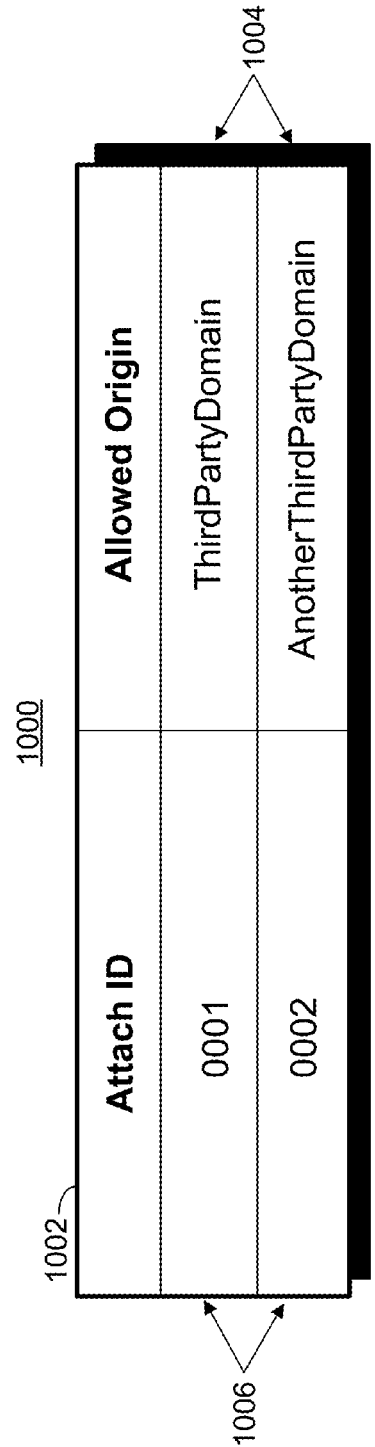

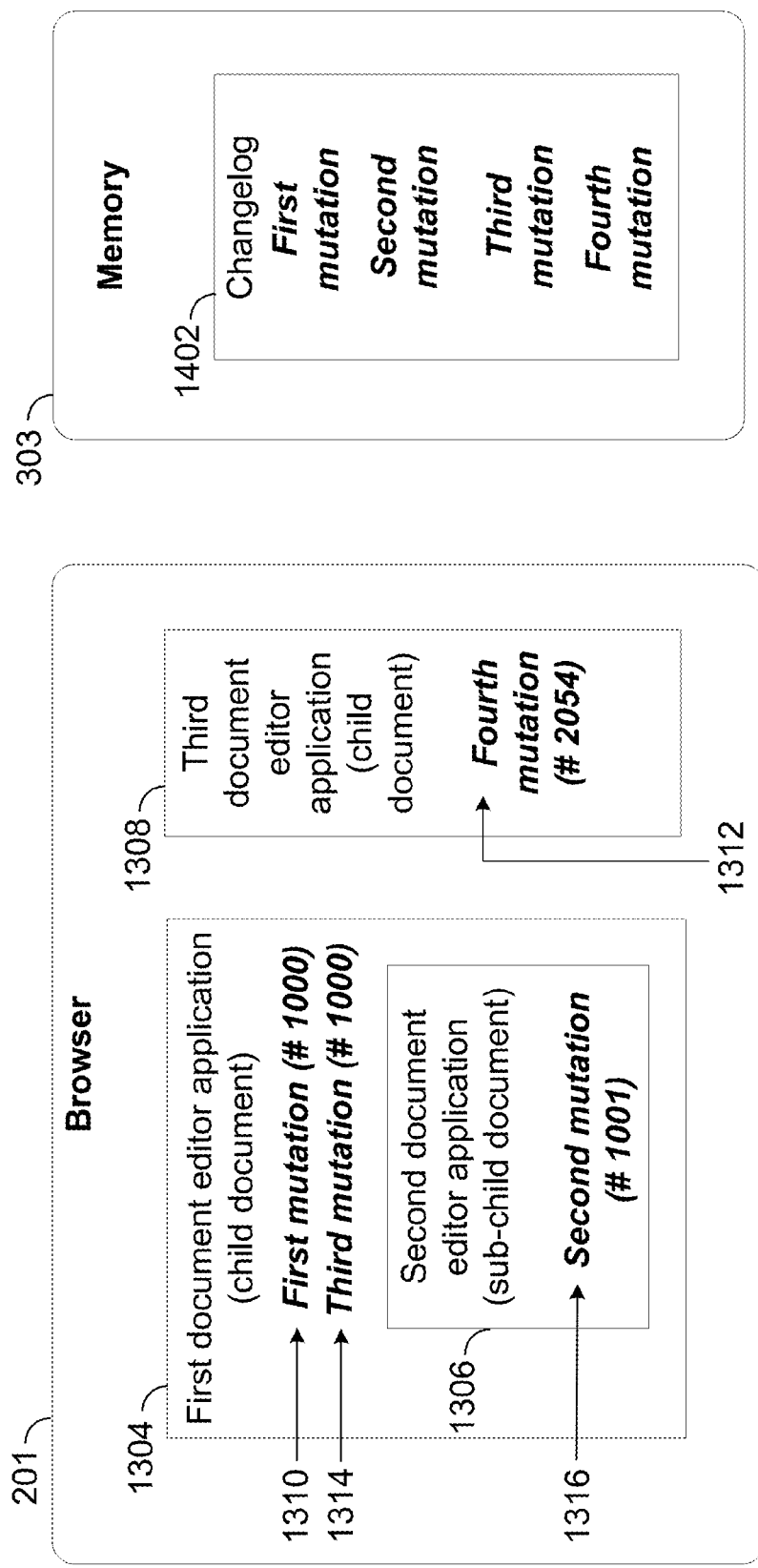

SYSTEM AND METHOD OF DOCUMENT EMBEDDING IN COLLABORATIVE EDITORS

TECHNICAL FIELD

This specification relates generally to systems, methods and apparatus for document embedding in collaborative editors and more particularly to systems, methods and apparatus for document embedding for heterogeneous document types in collaborative changelog-based web document editors.

BACKGROUND

Existing document editors allow users to access a document stored remotely from the user's device. For example, the user may use a laptop to access a document stored on a remote server via the Internet. The user may create modifications or changes to the document and send the changes to the remote server. The remote server may receive and apply the changes to the document.

In some document editors, the user may also access a document processor hosted by the remote server to view the document. As the document processor is hosted by the remote server, the remote server controls the document processor. Therefore, any changes made to the document, within the document processor, are transmitted to remote server.

SUMMARY

In accordance with an embodiment, a device embeds in a first frame, a second frame. A first mutation defining a first change made to a document within the first frame is generated. The first mutation is assigned a first embed identifier associated with the first frame. A second mutation defining a second change made to the document within the second frame is generated. The second mutation is assigned a second embed identifier associated with the second frame. The first mutation and the first embed identifier and the second mutation and the second embed identifier are transmitted to a remote server. A first instruction relating to the document and including the first embed identifier and a second instruction relating to the document and including the second embed identifier are received from a remote server. The first instruction, based on the first embed identifier, is transmitted by the device to the first frame. The second instruction, based on the second embed identifier, is transmitted by the device to the second frame.

In an embodiment, the first embed identifier is different than the second embed identifier.

In an embodiment, the first frame includes a third party application.

In an embodiment, the second frame includes a third party application. In an embodiment, the first frame includes a different third party application than the second frame.

In an embodiment, a batch mutation defining multiple changes made to the document within the first frame are generated. The batch mutation assigned a third embed identifier associated with the first frame. The batch mutation and the third embed identifier are transmitted to the remote server. A batch instruction, based on the third embed identifier, is transmitted by the device to the first frame. In an embodiment, the third embed identifier is equivalent to the first embed identifier.

In accordance with an embodiment, a plurality of mutations are received via a trusted frame. Each of the plurality of mutations include an embed identifier. The plurality of mutations are sorted based on embed identifiers to generate a first set of sorted plurality of mutations and a second set of sorted plurality of mutations. First operational transformation rules are applied to the first set of sorted plurality of mutations. A first set of instructions are generated based on applying the first operational transformation rules. Second operational transformation rules are applied to the second set of sorted plurality of mutations. A second set of instructions are generated based on applying the second operational transformation rules. The first set of instructions and the second set of instructions are transmitted to the trusted frame.

In an embodiment, the trusted frame is in communication with a device.

In an embodiment, the trusted frame is in communication with a remote server. In an embodiment, the trusted frame is entrusted by the remote server. In an embodiment, the remote server assigns the embed identifier.

In an embodiment, the plurality of mutations are received in a batch mutation via the trusted frame.

These and other advantages of the present disclosure will be apparent to those of ordinary skill in the art by reference to the following Detailed Description and the accompanying drawings.

BRIEF DESCRIPTION OF THE DRAWINGS

FIG. 9 shows a mapping between child frames and attach identifications, in accordance with an embodiment;

FIG. 10 shows a mapping between attach identifications and allowed origins, in accordance with an embodiment;

FIG. 13 shows multiple mutations, in accordance with an embodiment;

FIG. 14 shows a changelog, in accordance with an embodiment;

DETAILED DESCRIPTION

Figure 1:
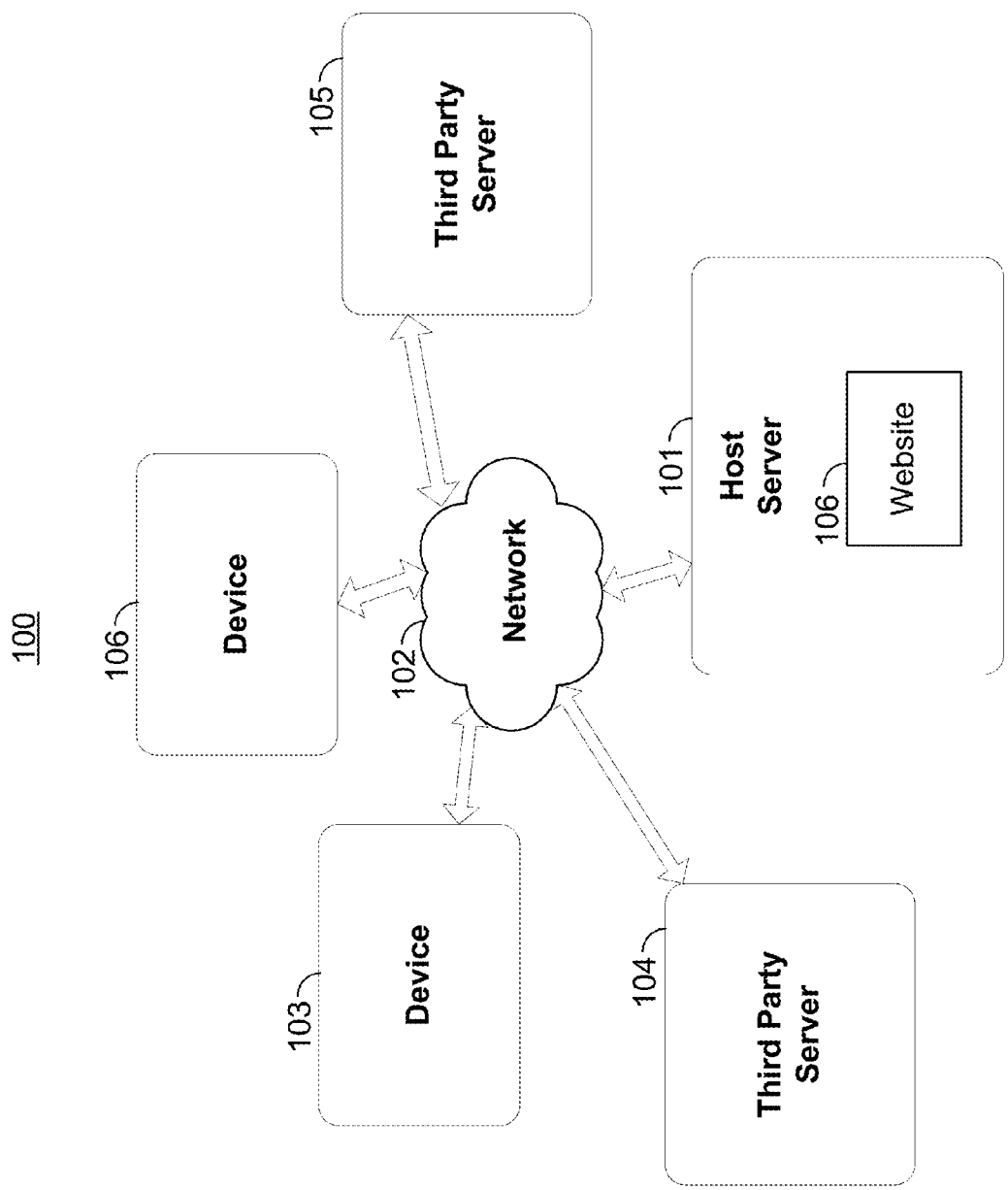
FIG. 1 shows a communication system that may be used to establish communication between frames, in accordance with an embodiment.

FIG. 1 shows a communication system 100 that may be used to establish communication between frames, in accordance with an embodiment. Communication system 100 includes a network 102, a host server 101, a device 103, a third party server 104, a third party server 105 and a device 106. Communication system 100 may include one device, two devices, or more devices. In an embodiment, communication system 100 may include more than one host server, one or more third party servers or other servers.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 102 may include a combination of different types of networks.

Communication system 100 also includes host server 101. In an embodiment, host server 101 may host a website 106 and may also host an application 316 (shown in FIG. 3) that can be accessed by device 103. In an alternate embodiment, the website and/or application may be hosted by any other server. In an embodiment, host server 101 may provide access to one or more webpages on website 106 providing access to application 316. Device 103 may access a World Wide Web page that may be viewed using a conventional web browser, for example.

Device 103 may be any device that enables a user to access application 316. Device 103 may be connected to network 102 through a direct (wired) link, or wirelessly. Device 103 may have a display screen (not shown) for displaying information. For example, device 103 may be a personal computer, a laptop computer, a workstation, a mainframe computer, a mobile communication device such as a wireless phone, a personal digital assistant, cellular device, a laptop computer, a netbook, a tablet device, an electronic book reader, etc. Other devices may be used.

Device 106 may be any type of device as described herein with respect to device 103. As described herein, device 103 and device 106 may include similar functionality. Therefore, any feature described herein with respect to device 103 is applicable to device 106.

Figure 2A:
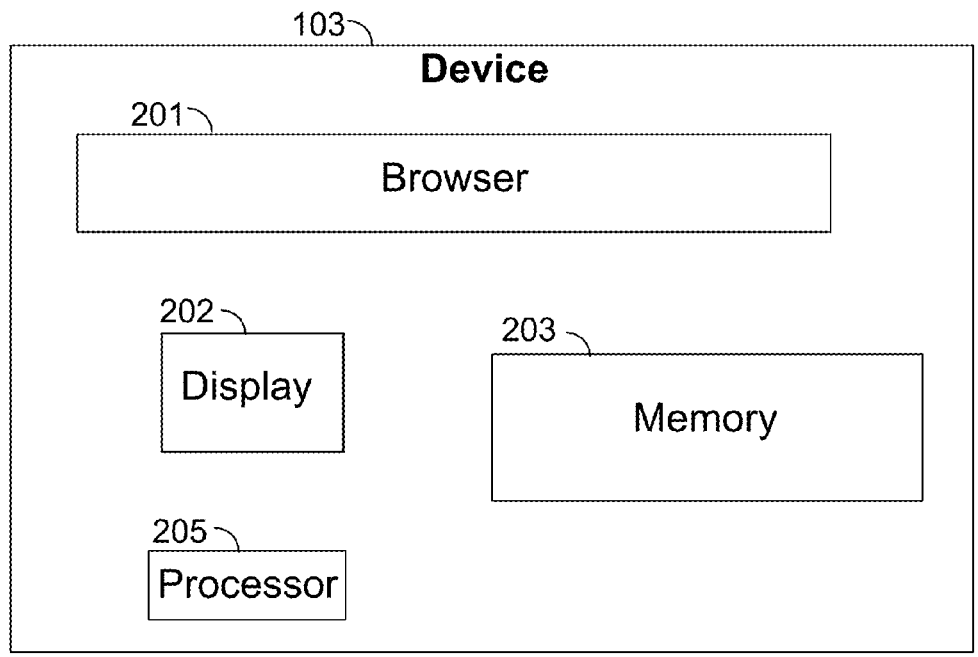
FIG. 2A shows functional components of a device, in accordance with an embodiment.

FIG. 2A shows functional components of device 103, in accordance with an embodiment. Device 103 includes a browser 201 and a display 202. Browser 201 may be a conventional web browser used to access World Wide Web sites via the Internet, for example. Display 202 provides display of software applications, webpages, documents, text, images, video, multimedia and other information. Device 103 also includes a memory 203 and a processor 205.

Figure 2B:
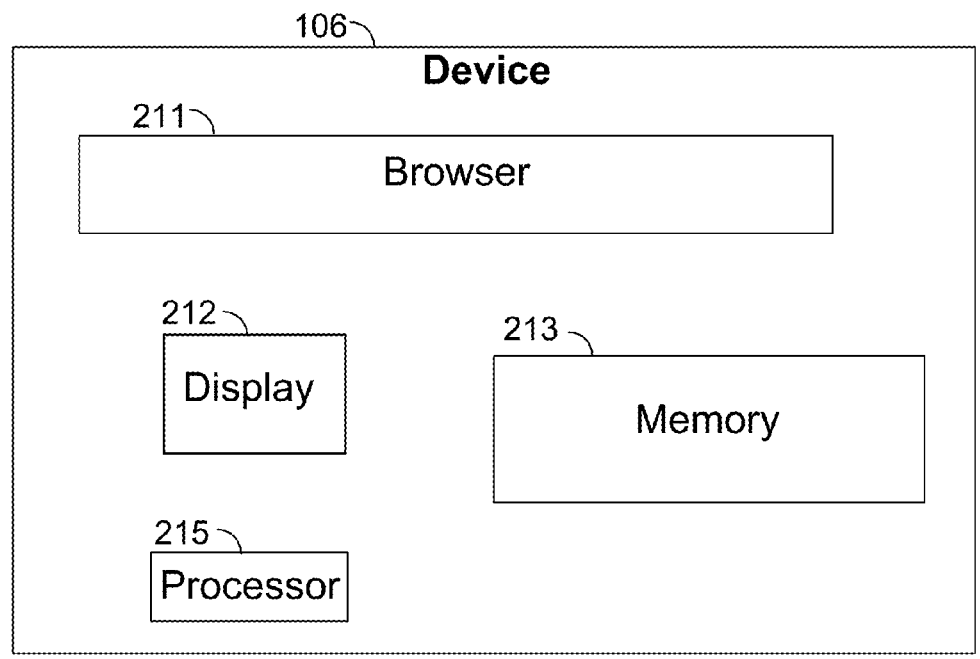
FIG. 2B shows functional components of a second device, in accordance with an embodiment.

FIG. 2B shows functional components of device 106, in accordance with an embodiment. Device 106 includes a browser 211 and a display 212. Browser 211 may be a conventional web browser used to access World Wide Web sites via the Internet, for example. Display 212 provides display of software applications, webpages, documents, text, images, video, multimedia and other information. Device 106 also includes a memory 213 and a processor 215.

Figure 3:
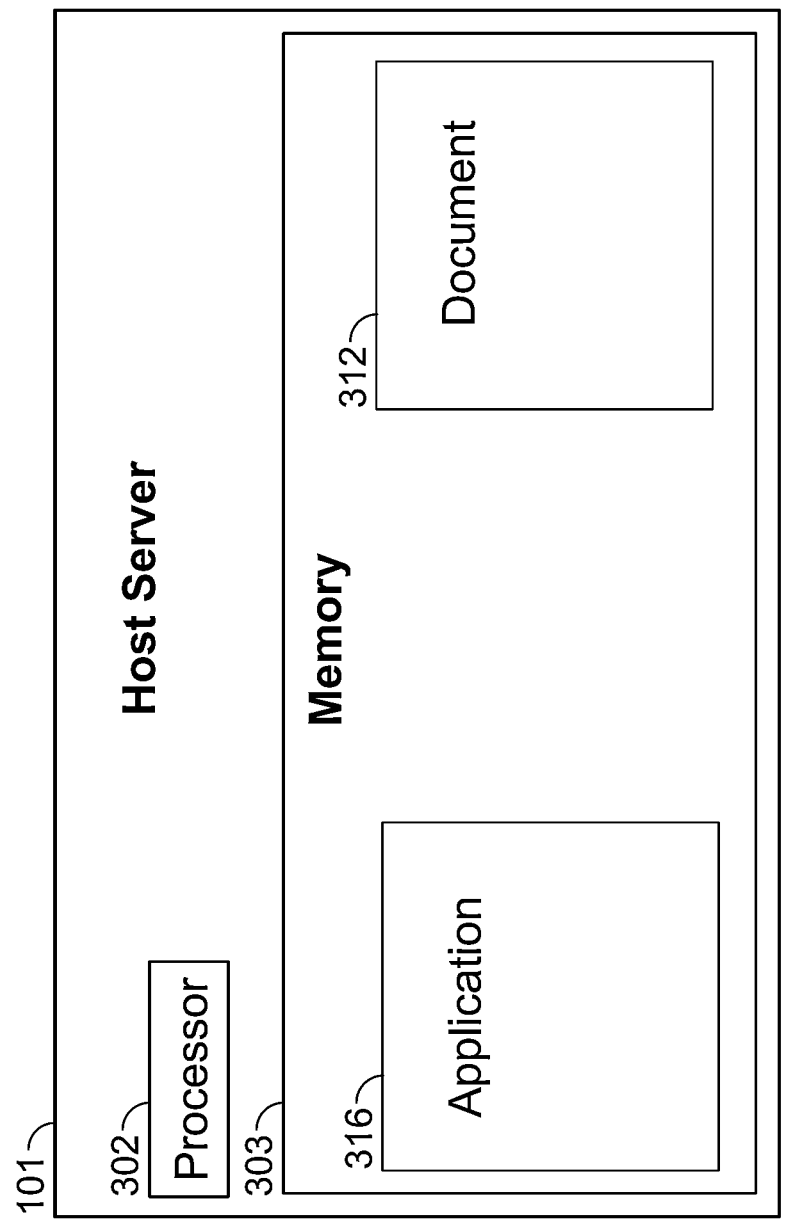
FIG. 3 shows functional components of a host server, in accordance with an embodiment.

FIG. 3 shows functional components of host server 101, in accordance with an embodiment. Host server 101 includes a processor 302 and a memory 303. Host server 101 may include other components not shown in FIG. 3. Memory 303 stores application 316. A document 312 is also stored in memory 303. Other documents applications may be stored in memory 303. In an alternative embodiment, application 316 and document 312 may be stored external to memory 303 and host server 101.

Figure 4:
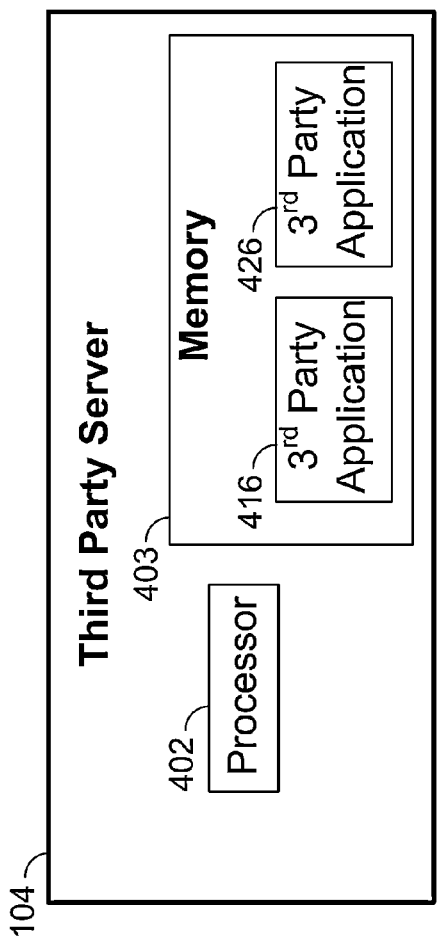
FIG. 4 shows functional components of a third party server, in accordance with an embodiment.

FIG. 4 shows functional components of third party server 104, in accordance with an embodiment. Third party server 104 includes a processor 402 and a memory 403. Memory 403 stores a third party application 416 and a third party application 426. Third party server 104 may include other components not shown in FIG. 4.

Figure 5:
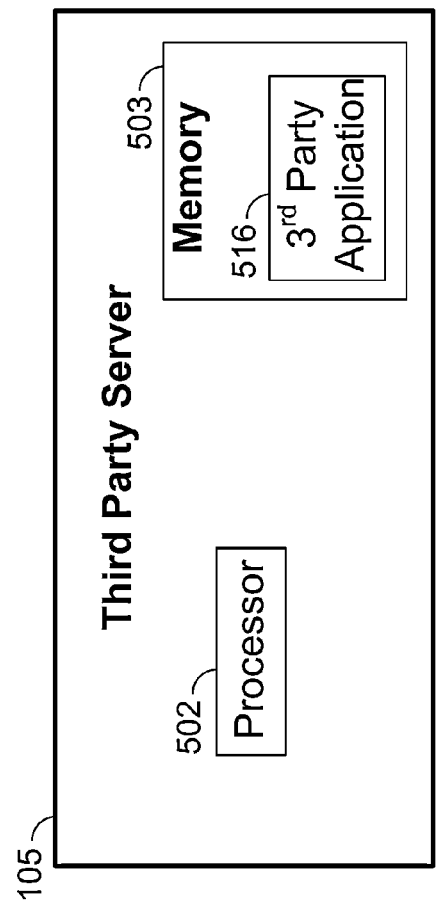
FIG. 5 shows functional components of a third party server, in accordance with an embodiment.

FIG. 5 shows functional components of third party server 105, in accordance with an embodiment. Third party server 105 includes a processor 502 and a memory 503. Memory 503 stores a third party application 516. Third party server 105 may include other components not shown in FIG. 5.

Frames

Figure 7:
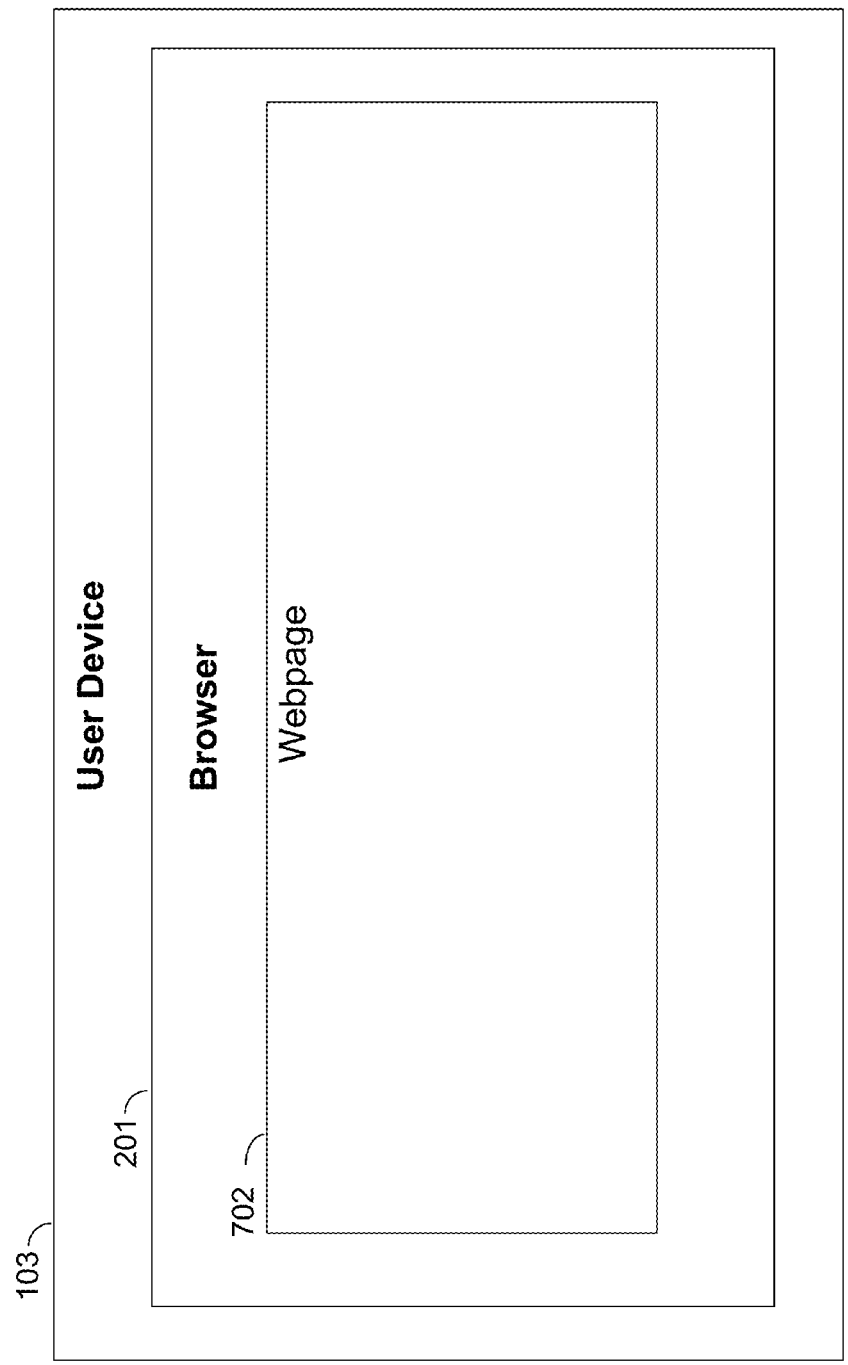
FIG. 7 shows a display of a webpage, in accordance with an embodiment.

Frames may be used to communicate actions or commands between device 103, host server 101, third party server 104 and third party server 105. For example, suppose that a user employing user device 103 wishes to access application 316. As depicted in FIG. 7, device 103 may provide a display of a webpage 702 in browser 201. Webpage 702 may be one of the webpages that are included as a part of website 106. Application 316 may be executed on user device 103. In another embodiment, application 316 may be accessed by user device 103 but executed on a remote machine (e.g. host server 101). Application 316 may include or otherwise utilize other applications, extensions, add-ons, functions, programs, etc. Other applications may include a web application, a document processing application, a multimedia player application, a social media network application, a spreadsheet application, a presentation application, a game application, an image editing application, a video editing application, etc. In the illustrative embodiment of FIGS. 4 and 5, application 316 may include or otherwise utilize third party application 416, third party application 426, and third party application 516. Each of third party application 416, third party application 426, and third party application 516 may be compatible with application 316 and with each other.

Suppose that the user employing device 103 accesses application 316 (hosted by host server 101), and wishes to access one or more third party applications 416, 426, and 516. It may be necessary for communication to be conducted between device 103 and host server 101, and also between device 103 and third party applications 416, 426, and 516, and further between application 316 and third party applications 416, 426, and 516. However, it may be advantageous to conduct communications among these entities in distinct channels for purposes of maintaining security. When an action or command is issued for any one of application 316, third party application 416, third party application 426, and third party application 516 by the user employing device 103, the action or command is communicated via one or more frames. In an embodiment, application 316 is owned by, created by, in communication with, or otherwise entrusted by host server 101. As application 316 is entrusted by host server 101, any communication between application 316 and host server 101 occurs in a trusted frame. Third party application 416 and third party application 426 may be hosted by third party server 104 and third party application 516 may be hosted by third party server 105. Therefore, third party application 416, third party application 426, and third party application 516 may not be in direct communication with host server 101, as they are hosted by third party servers that may not be entrusted by host server 101. Thus, any communication between any of third party application 416, third party application 426, and third party application 516 and host server 101 occurs in respective child frames.

Figure 8:
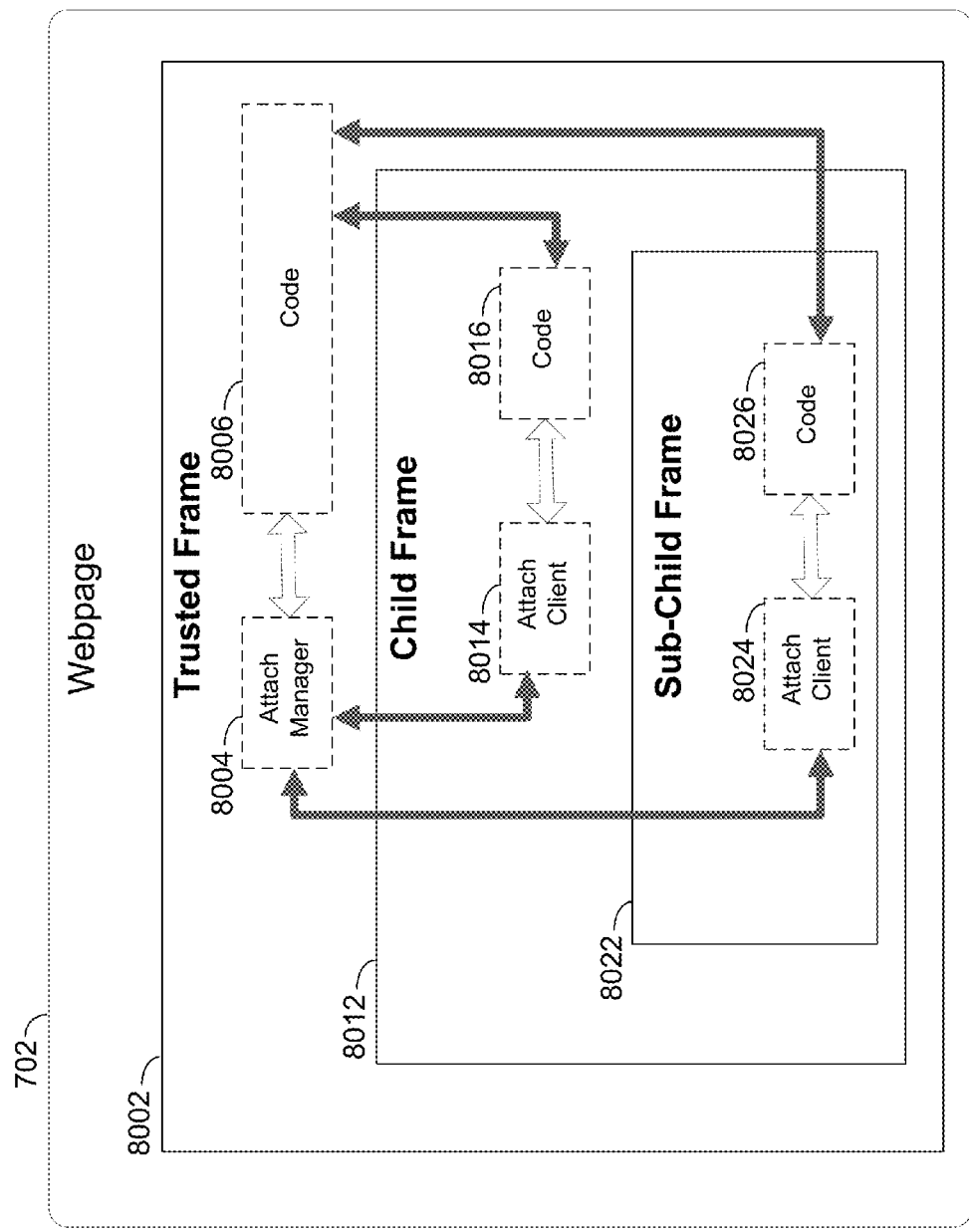
FIG. 8 is shows a detailed display of a webpage, in accordance with an embodiment.

In an embodiment, device 103, device 106 and other devices may provide access to application 316. In an embodiment, application 316 is a spreadsheet application and document 312 is a spreadsheet document. Suppose that a user employing device 103 wishes to access document 312. Document 312 may be a spreadsheet document created using application 316. In order to access document 312 and make changes to document 312, the user may connect to host server 101, via network 102. In order for device 103 to communicate with host server 101, frames depicted by FIG. 8 are used.

Figure 6A:
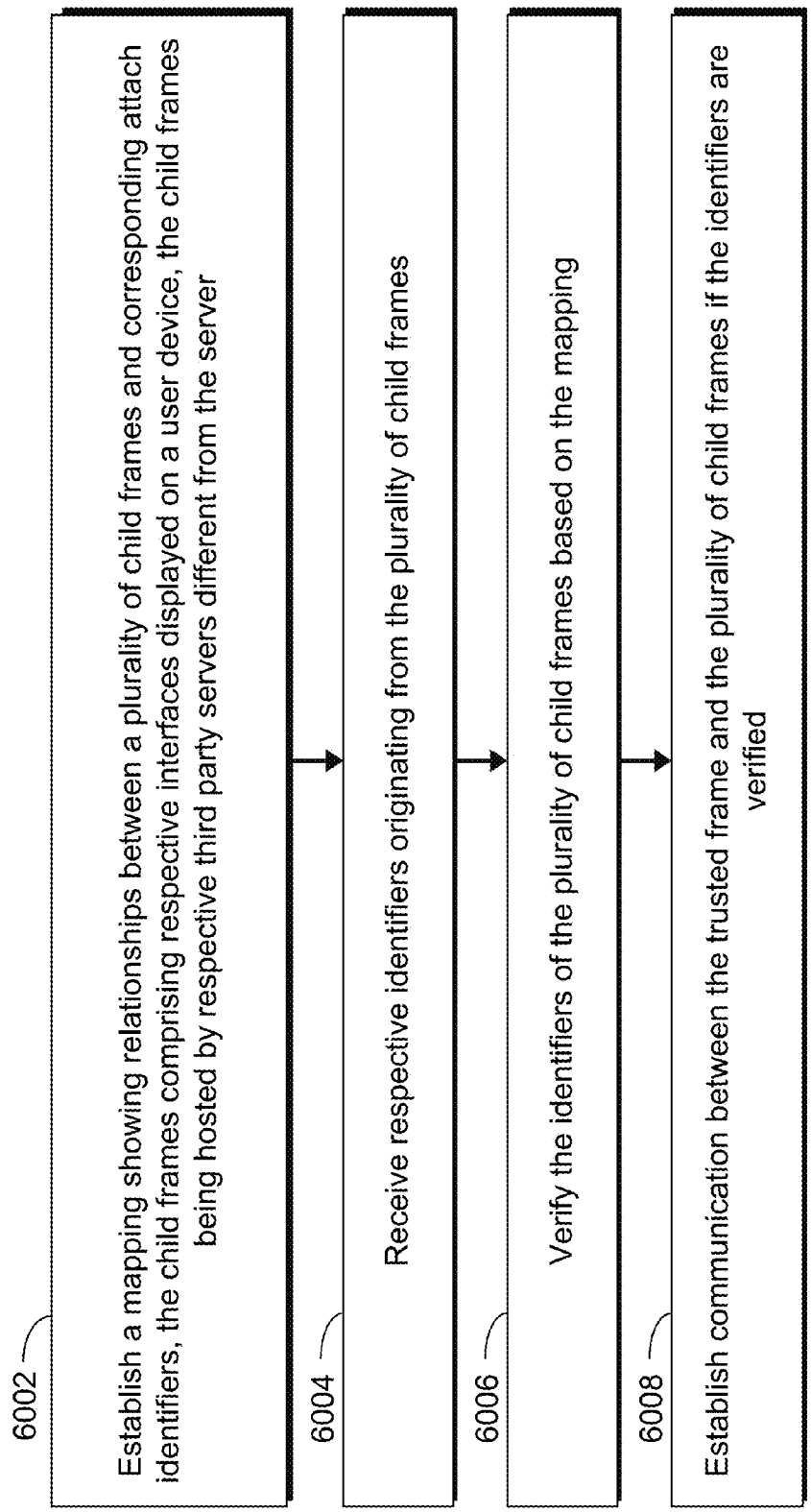
FIG. 6A is a flowchart depicting a method of establishing communication between frames, in accordance with an embodiment.

Details of how frames are used for communication will be described herein with reference to FIG. 6A. FIG. 6A is a flowchart depicting a method of establishing communication between frames, in accordance with an embodiment. Specifically, FIG. 6A is a flowchart depicting a method establishing communication between a trusted frame 8002 hosted by host server 101 and a plurality of child frames (e.g. a child frame 8012, a sub-child frame 8022).

At step 6002, a mapping is established showing relationships between a plurality of child frames and corresponding attach identifiers. The child frames include respective interfaces displayed on a user device and the child frames are hosted by respective third party servers different from the server. As shown in FIG. 8, child frame 8012 and sub-child frame 8022 communicate with a trusted frame 8002. Details retarding the communication between these frames will be described herein. Referring now to FIG. 9, a mapping 900 is established showing relationships between a plurality of child frames 9004 and corresponding attach identifiers (ID) 9006 by host server 101. In an embodiment depicted by FIG. 9, child frame 8012 corresponds to attach ID 0001 and sub-child frame 8022 corresponds to attach ID 0002. Attach ID 0001 is different than attach ID 0002. Child frame 8012 and sub-child frame 8022 include respective interfaces displayed on user device 103 and child frame 8012 and sub-child frame 8022 are hosted by respective third party servers 104 and 105 different from host server 101.

Referring to FIG. 10, a mapping 1000 is also established. In FIG. 10, a table 1002 maps an attach ID 1006 and a corresponding allowed origin 1004. Table 1002 is used to determine whether an attach ID associated with a child frame is associated with an allowed origin. If the mapping exists, communication can be established. If however, the mapping does not exist, communication between cannot be established and a new frame associated with a new domain (e.g. not mapped) may be required to complete a registration process. Host server 101 accordingly generates mappings 900 and 1000.

As depicted by FIG. 8, a display of webpage 702 is provided. Webpage 702 may be provided for display on device 103. Trusted frame 8002 is hosted by server 101. Trusted frame 8002 includes an attach manager 8004 and code 8006. Webpage 702 also includes child frame 8012. Child frame 8012 includes an attach client 8014 and code 8016. Webpage 702 also includes sub-child frame 8022. Sub-child frame 8022 includes an attach client 8024 and code 8026. Trusted frame 8002, child frame 8012 and sub-child frame 8022 and their contents may be employed in the background of webpage 702 in browser 201 and may not be viewable to a user employing device 103.

In an embodiment, sub-child frame 8022 is embedded within child frame 8012. In an embodiment, multiple child frames may be provided. One of a plurality of child frames is a sub-child frame embedded within another one of the plurality of child frames. Sub-child frame 8022 may provide communication in an application or an add-on to an application within child frame 8012. In an embodiment, each of child frame 8012 and sub-child frame 8022 is hosted by a respective third party server. In an embodiment depicted by FIG. 1, child frame 8012 may be hosted by third party server 104 and sub-child frame 8022 may be hosted by third party server 105. Therefore, each of the respective third party servers is associated with a different respective domain. In an alternate embodiment, each of the respective third party servers is associated with a same domain. For example, both child frame 8012 and sub-child frame 8022 may associated with a domain associated with third party server 104. Child frame 8012 and sub-child frame 8022 may both be referred to herein generally as child frames.

Suppose now that a user employing device 103 wishes to access application 316 to open document 312. Document 312 may include references that enable access to application 416 and application 426. For example, if document 312 is a spreadsheet application, application 416 and application 426 may be mathematical calculators capable of calculating formulas used in document 312. Application 416 and application 426 are executed by third party server 104 but utilized by application 316 and document 312, executed by host server 101.

In order for application 416 and application 426 to communicate with host server 101, child frame 8012 and sub-child frame 8022 are used. For example, any commands issued by application 416 are communicated via child frame 8012 and any commands issued by application 426 are communicated via sub-child frame 8022. These commands are sent via child frame 8012 and sub-child frame 8022 to trusted frame 8002, which acts as an intermediary between third party sources and host server 101. Trusted frame 8002, via attach manager 8004, communicates all commands to host server 101, via network 103. Attach manager 8004 may listen for messages sent to trusted frame 8002. Code 8006 may be JAVASCRIPT code running in trusted frame 8002 and provide attach manager 8004 with a set of "attach mapping" pairs to register. JAVASCRIPT is a browser implemented coding language. Code 8006 may communicate with code 8016 and code 8026 in a postmessage( ) form. Communication between attach manager 8004 and attach client 8014 and attach client 8024 may be in a postmessage( ) form. Internal communication between attach manager 8004 and code 8006; attach client 8014 and code 8016; and attach client 8024 and code 8026 may be in a form of local communication. Trusted code 8006 may communicate bidirectionally with host server 101, via network 102, using XHR, where "X" stands for XML (Extensible Markup Language), "H" stands for HTTP (Hypertext Transfer Protocol) and "R" stands for request.

Referring back to FIG. 6A, at step 6004, respective identifiers originating from the plurality of child frames are received. Respective identifiers (i.e. attach IDs 9006) originating from a plurality of child frames (i.e. child frame 8012 and sub-child frame 8022) are received by host server 101 (e.g. via trusted frame 8002).

At step 6006, the identifiers of the plurality of child frames are verified based on the mapping. The identifiers (i.e. attach IDs 9006) of the plurality of child frames (i.e. child frame 8012 and sub-child frame 8022) are verified based on the mapping, shown by FIGS. 9 and 10.

At step 6008, communication is established between the trusted frame and the plurality of child frames if the attach identifiers are verified. Communication between trusted frame 8002 and the plurality of child frames (i.e. child frame 8012 and sub-child frame 8022) is established if the attach identifiers (i.e. attach IDs 9006) are verified. For example, suppose that one or more commands having an attach ID numbered 0001 are sent by child frame 8012 to trusted frame 8002. Based on mappings 900 and 1000, trusted frame 8002, via host server 101, verifies that attach ID numbered 0001, communicated by child frame 8012, which is associated with an allowed origin. As seen by FIG. 10, table 1002 lists attach ID 1006 and the corresponding allowed origin 1004. Therefore, a verification is made whether attach ID numbered 0001 corresponds to an allowed origin; specifically, attach ID numbered 0001 corresponds to "ThirdPartyDomain." Similarly, a verification is made for the attach ID numbered 0002. Thus, after the origin of the attach IDs are verified, communication between trusted frame 8002 and the plurality of child frames (i.e. child frame 8012 and sub-child frame 8022) is established.

In summary, the following steps are performed by attach manager 8004:

1. Attach manager 8004 listens for all attach messages sent to trusted frame 8002.

2. Code 8006 running in trusted frame 8004 provides attach manager 8004 with a set of "attach mapping" pairs to register, as described above. These pairs consist of a unique attach ID and a domain that is allowed to attach using that attach ID. These mappings determine which child frames are allowed to communicate with the trusted frame.

3. Child frame 8012 is loaded and begins the attach loop. This step may be performed periodically (e.g., once per second) until the attach process is successful. For each step of the loop, the child frame attach manager sends an "attach request" to any parent frame and any superparent frames.

The "attach request" may contain the attach ID that was registered with attach manager 8004 (this ID may be provided to child frame 8012 using a variety of methods, such as a URL fragment parameter). An HTML5 window.postMessage API may be used to send this message, and the target domain parameter may be set to the domain of trusted frame 8002. This may prevent any intermediate frames from receiving or intercepting the attach request.

4. Attach manager 8004 receives an attach request with an attach ID.

5. Attach manager 8004 verifies that the attach ID has been registered, and that the registered domain for that attach ID matches the HTML (Hyper Text Markup Language)5-provided origin. HTML-5 provided origin may be provided by the browser and may not be forged by a rogue child frame.

6. The attach manager stores the HTML5-provided window object from the request in a map keyed on the attach ID.

7. Attach manager 8004 may sends an attach-acknowledgement to the sender.

8. Child frame 8012's attach client 8014 may store the HTML5-provided window object.

Once attach manager 8004 receives the attach request, it verifies that the attach ID has been registered and that the origin (provided by the postMessage event) matches the registered origin for the application frame. Attach manager 8004 adds the window document object model (DOM) element (provided by the postMessage event) to a map of attach IDs to associated windows. Attach manager 8004 sends an attach acknowledgement to attach client 8014 using window.postMessage( ). Child frame 8012 receives the attach acknowledgement, verifies that the origin (provided by the postMessage event) matches the expected origin from the trusted frame, and stores the window DOM element (also provided by the postMessage event). The attach client fires an attach event with the trusted frame's window DOM element. The trusted attach manager fires an attach event with the attach frame's window DOM element and the attach ID.

After attaching, in order to send a message from child frame 8012 to trusted frame 8002, child frame 8012 may call the postMessage method on the stored window object. The target domain is set to the domain of the trusted frame to prevent interception. To send a message from trusted frame 8002 to child frame 8012, JAVASCRIPT in trusted frame 8002 may query attach manager 8004 with the attach ID that it wishes to communicate with, and attach manager 8004 returns a window object and target domain. Trusted frame 8002's code 8006 may then calls the postMessage method on the window object.

In an embodiment, a custom plugin may be used to implement similar functionality. In an embodiment, communication may be proxied through any intermediate frames (e.g. between trusted frame 8002 and the child frame 8012). In another embodiment, child frame 8012 may be created as a direct child of trusted frame 8002. One or more security verification procedures may be used in order to entrust child frame 8012 and establish direct communication with host server 101.

In an embodiment depicted by FIGS. 9 and 10, mapping 1000 may be performed prior to mapping 900 and mapping 1000 may be in order to establish mapping 900. For example, trusted frame 8002 may establish a mapping between attach ID 0001 and an allowed origin, ThirdPartyDomain. In an embodiment, this mapping may be performed prior to determining mapping 900 in FIG. 9 (the mapping between a child frame and an attach ID). Trusted frame 8002 may then wait for an attempt by child frame (e.g. child frame 8012) to attach, verify the origin (e.g. ThirdPartyDomain) of the child frame based on mapping 1000 and then associate attach ID 0001 with child frame 9012. In an embodiment, at substantially the same time as trusted frame 8002 associates an attach ID with a child frame, as in mapping 1000, trusted frame 8002 may respond to the child frame such that the child frame can store a pointer to trusted frame 8002. In an embodiment, this procedure may be performed each time a mapping between a child frame and attach identifier is made.

Figure 6B:
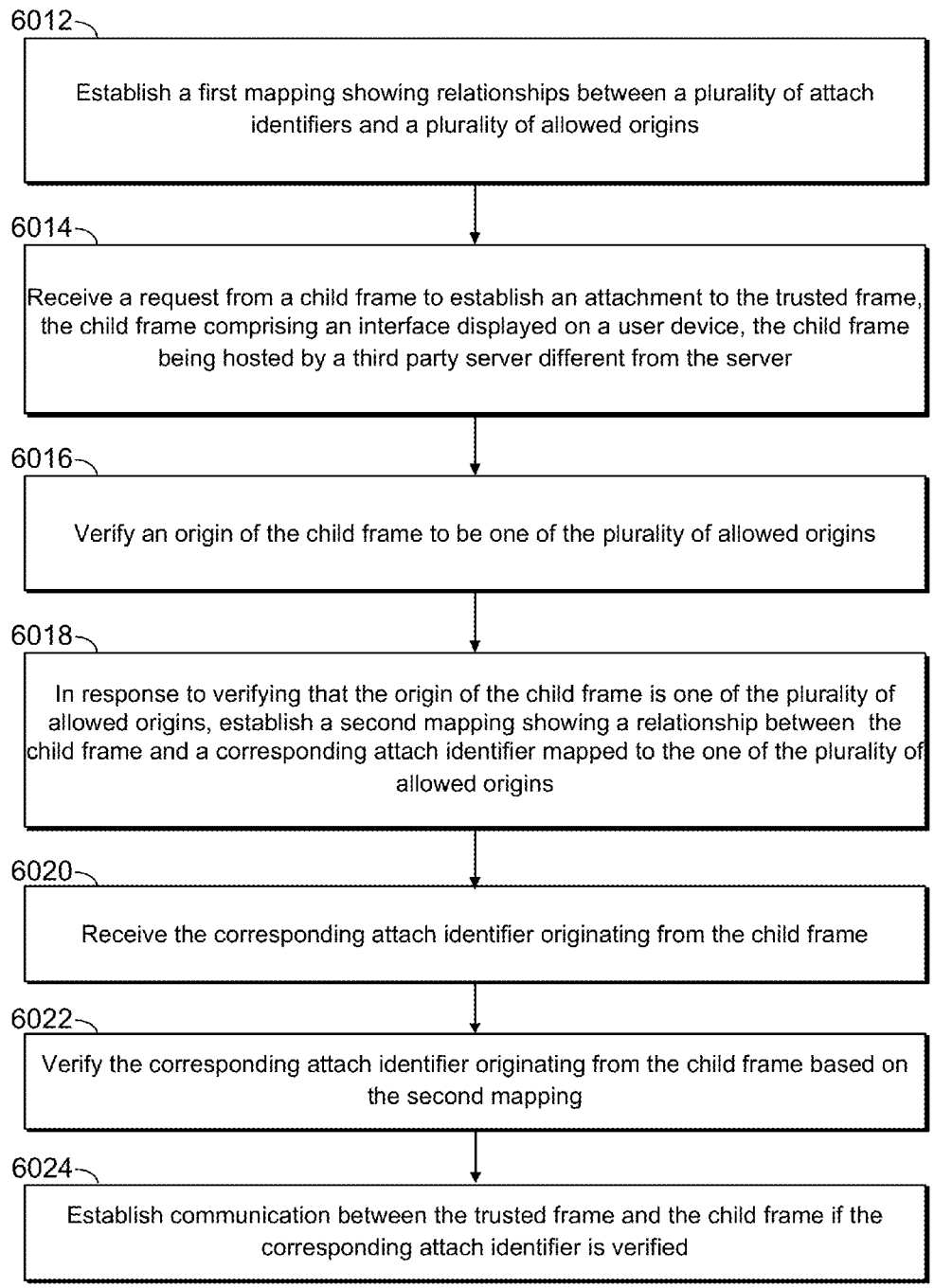
FIG. 6B is a flowchart depicting a method of establishing mappings, in accordance with an embodiment.

Details of the two mappings as established will be described herein with reference to FIG. 6B. FIG. 6B is a flowchart depicting a method of establishing mappings, in accordance with an embodiment. At step 6012, a first mapping showing relationships between a plurality of attach identifiers and a plurality of allowed origins is established. Host server 101 establishes mapping 1000 between attach ID 1006 and corresponding allowed origin 1004.

At step 6014, a request from a child frame to establish an attachment to the trusted frame is received. The child frame comprises an interface displayed on a user device, and the child frame is hosted by a third party server different from the server. Host server 101 receives a request from child frame 8012 to establish an attachment or connection to trusted frame 8002. Child frame 8012 includes an interface displayed on user device 103 and child frame 8012 is hosted by third party server 104 different from host server 101.

At step 6016, an origin of the child frame is verified to be one of the plurality of allowed origins. Host server 101 verifies ThirdPartyDomain origin of child frame 8012 to be one of the plurality of allowed origins shown by mapping 1000.

At step 6018, in response to verifying that the origin of the child frame is one of the plurality of allowed origins, a second mapping showing a relationship between the child frame and a corresponding attach identifier mapped to the one of the plurality of allowed origins is established. Host server 101, in response to verifying that ThirdPartyDomain origin of child frame 8012 is one of the plurality of allowed origins shown by mapping 1000, establishes mapping 900 showing a relationships between one of the child frames 9004 and one of corresponding attach identifiers (ID) 9006 (e.g. attach ID 0001) mapped to ThirdPartyDomain.

At step 6020, the corresponding attach identifier originating from the child frame is received. Host server 101 receives one of the corresponding attach identifiers (ID) 9006 originating from child frame 8012. For example, child frame 8012 may transmit to host server 101 attach ID 0001 and host server 101 may receive attach ID 0001.

At step 6022, the corresponding attach identifier originating from the child frame based on the second mapping is verified. Host server 101 verifies the corresponding attach identifier (e.g. attach ID 0001) originating from child frame 8012 based on mapping 900.

At step 6024, communication between the trusted frame and the child frame is established if the corresponding attach identifier is verified. Communication between trusted frame 8002 and child frames 8012 is established if the attach identifier (i.e. attach ID 0001) is verified by host server 101.

Embedding

Suppose now that host server 101 provides real-time collaborative editing of documents. Details regarding real-time collaborative editing of documents are described in U.S. patent application Ser. No. 13/224,479 filed Sep. 2, 2011; U.S. patent application Ser. No. 13/224,530 filed Sep. 2, 2011; U.S. patent application Ser. No. 13/224,573 filed Sep. 2, 2011; U.S. patent application Ser. No. 13/224,663 filed Sep. 2, 2011; U.S. patent application Ser. No. 13/224,769 filed Sep. 2, 2011; U.S. patent application Ser. No. 13/224,860 filed Sep. 2, 2011; U.S. patent application Ser. No. 13/297,762 filed Nov. 16, 2011; U.S. patent application Ser. No. 13/551,772 filed Jul. 18, 2012; U.S. patent application Ser. No. 13/551,859 filed Jul. 18, 2012; U.S. patent application Ser. No. 13/591,734 filed Aug. 22, 2012; and U.S. patent application Ser. No. 13/591,851 filed Aug. 22, 2012, the contents of which are hereby incorporated herein by reference in their entirety.

As described above, host server 101 may host applications such as a web application, a document processing application, a multimedia player application, a social media network application, a spreadsheet application, a presentation application, a game application, an image editing application, a video editing application, etc. In the exemplary embodiment depicted by FIG. 11 which provides a graphical representation of embedded documents, one or more users may access a spreadsheet application 1100 and open up a spreadsheet document 1102. Spreadsheet application 1100 may be a type of application 316 in FIG. 3 and spreadsheet document 1102 may be a type of document 312. One or more document editors may be embedded inside any other document editor.

Mutations (i.e. changes) made within one document editor which is embedded inside another editor may be stored in a single changelog. Spreadsheet document 1102 may maintain a revision history of all actions or mutations made within the document by the respective device. Host server 101 may maintain a master revision history of all actions issued by all devices to the document.

A user may be provided with the ability to view or restore a previous version of the spreadsheet document 1102 by using the changelog.

Figure 11:
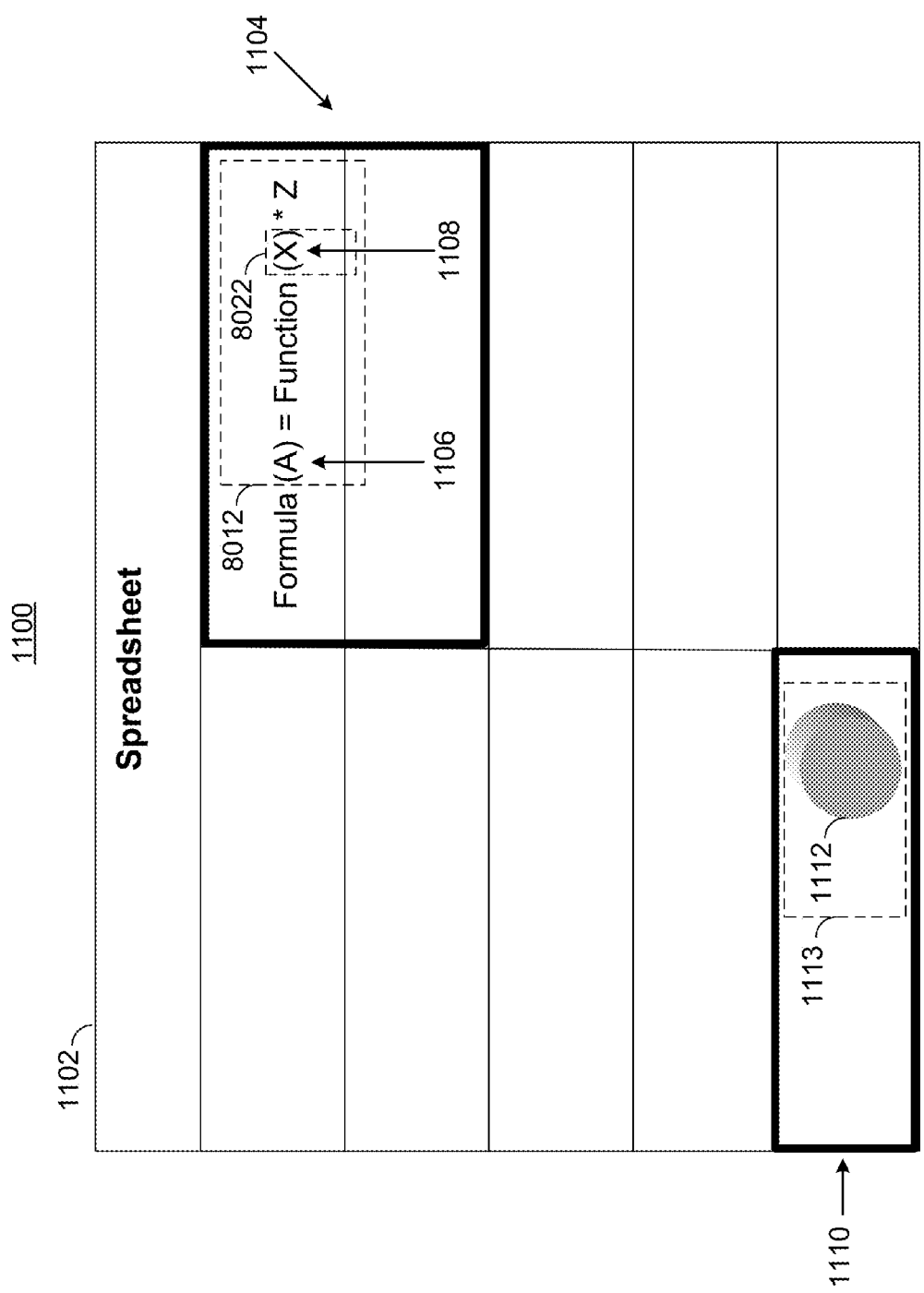
FIG. 11 shows a graphical representation of embedded documents, in accordance with an embodiment.

Suppose that spreadsheet document 1102 is provided for display to one or more users. For example, a first user employing device 103 may be collaborating with a second user employing user device 106 on spreadsheet document 1102. Each of the users may be provided with a display of spreadsheet document 1102, as depicted by FIG. 11. Each of the users may remotely access spreadsheet document 1102. For example, a first user may access spreadsheet document 1102 using a netbook while a second user may access spreadsheet document 1102 using a mobile phone. The users may connect to host server 101 via a network 102 to access the spreadsheet document.

Suppose now that the first user wishes to select an area 1104 to embed application 416 which may be a formula application 1106 into spreadsheet document 1102. The first user wishes to embed formula application 1106 and application 426, which may be a function 1108, within spreadsheet document 1102. In an embodiment, formula application 1106 may be an application that is created by, owned, maintained or otherwise controlled by third party server 104. Function 1108 may be embedded within formula application 1106, and may be also be controlled by third party server 104. For example, a developer employed by third party server may have created formula application 1106 and another developer may have created function 1108 to work with formula application 1106. Alternatively, formula application 1106 and function 1108 may be programmed to work with one another in an embedded environment, however, may be controlled by remote and separate third party servers.

The user inputs a function Formula (A)=Function (X)*Z into area 1104. Formula application 1106 may be provided to the user within webpage 702. Specifically, formula application 1106 may be displayed to the user in a portion of area 1104 of webpage 702 or elsewhere within webpage 702. In an embodiment depicted by FIG. 11, formula application 1106 may be displayed within child frame 8012 and function 1108 may be displayed within sub-child frame 8022. Any information related to formula application 1106 and any mutations related to formula applications 1106 may be displayed within child frame 8012. Similarly, any information related to function 1108 and any mutations related to function 1108 may be displayed within sub-child frame 8022. Child frame 8012 and sub-child frame 8022 may be visible or invisible to the user. The arrangement of the frames in FIG. 11 is provided for exemplary purposes and other arrangements of frames are possible in the embedding system.

The second user may wish to input a drawing into spreadsheet document 1102. The second user may select area 1110 to place the drawing. The second user selects an image editor or other application to embed a drawing 1112 of a pie chart into spreadsheet document 1102. The second user may select an image editor, which is compatible with spreadsheet application 1100, to create and modify drawing 1112. The image editor may be third party application 516 which may be created by, owned, maintained or otherwise controlled by third party server 105. Any information related to drawing 1112 and any mutations related to drawing 1112 are displayed within frame 1113. Frame 1113 may be visible or invisible to the user.

In an embodiment, spreadsheet application 1100 and spreadsheet document 1102 may be created by, owned, maintained or otherwise controlled by host server 101. In an alternate embodiment, spreadsheet application 1100 and spreadsheet document 1102 may be controlled by another server, however, host server 101 establishes trust with the other server and therefore, host server 101 establishes trust with the host of spreadsheet application 1100.

In yet another embodiment, spreadsheet application 1100 and spreadsheet document 1102 may not be trusted by host server 101 and may instead be hosted by a third party server (e.g. third party server 104).

In an embodiment where host server 101 is the host or has established trust with the host of spreadsheet application 1100 and spreadsheet document 1102, commands issued by device 103 that are associated with spreadsheet application 1100 and spreadsheet document 1102 may be communicated to host server via trusted frame 8002. Commands issued that are associated with embedded applications within spreadsheet application 1100 and spreadsheet document 1102 are also communicated via trusted frame 8002, which acts as an intermediary between host server 101 and any third party servers that may not be trusted by host server 101. Details regarding communication between the frames will be described herein in reference to the flowchart of FIG. 12.

Figure 12:
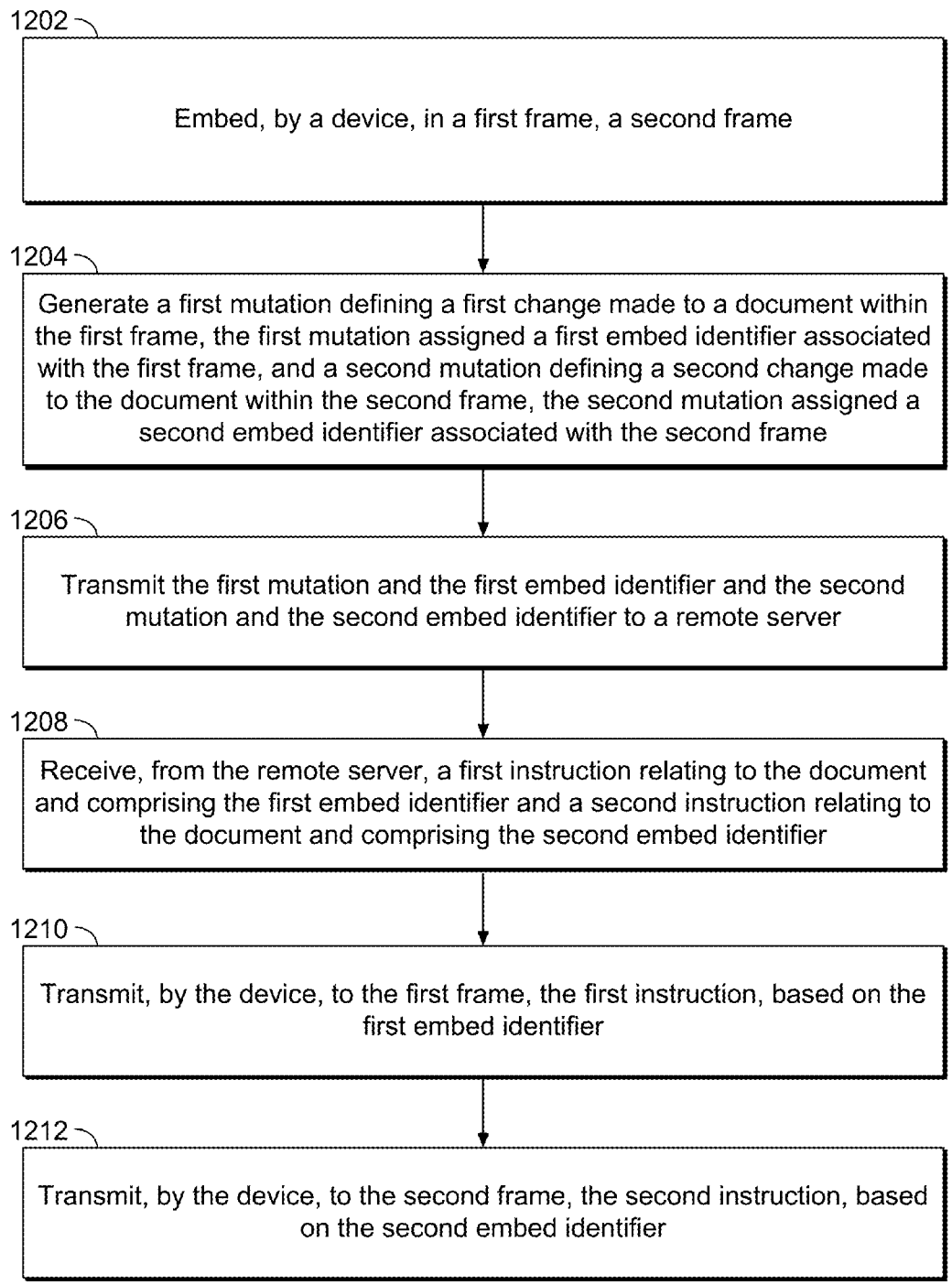
FIG. 12 is a flowchart of a method of communicating mutations, in accordance with an embodiment.

FIG. 12 depicts a flowchart of a method of communicating mutations, in accordance with an embodiment. At step 1202, a device embeds, in a first frame, a second frame. Device 103 embeds, within child frame 8012, sub-child frame 8022. Sub-child frame 8022, including function 1108, is embedded within child frame 8012, including formula application 1106. Formula application 1106 (or a formula document editor application) may be third party application 426.

In an embodiment, embedding is performed using the interaction of device 103 and host server 101. In an embodiment, it is host server 101's responsibility is to communicate with device 103, perform operational transformation (e.g. individually for each embed ID), and store the document data. Host server 101 communicates with device 103 and hosts trusted frame 8002 (which may routes mutations and acknowledgements between host server 101 and the application frames) and the application frames (which may also perform operational transformation and handle interpreting and displaying the document contents). In an embodiment, user-visible parts of embedding may be implemented by the device 103, whereas host server 101 may be responsible for storage and may assist in the collaborative aspects of the embedding feature.

In an embodiment, the embedding of applications occurs within spreadsheet document 1102. Trusted frame 8002 may include spreadsheet document 1102, child frame 8012 and sub-child frame 8012.

At step 1204, a first mutation defining a first change made to a document within the first frame is generated, the first mutation assigned a first embed identifier associated with the first frame, and a second mutation defining a second change made to the document within the second frame is generated, the second mutation assigned a second embed identifier associated with the second frame. In FIG. 11, a user employing device 103 may make a first change to spreadsheet document 1102 displayed within child frame 8012. For example, formula application 1106 may calculate an income tax in spreadsheet document 1102. Formula application 1106 may be contain a tax percentage for the previous tax year. The tax percentage within the formula application may be edited or changed to update a percentage of income tax for the current year.

As depicted by FIG. 13, mutations generated by the user are provided. Within browser 201 of user device 103, (e.g. within a document such as spreadsheet document 1102), a first document editor application (child document) 1304 is provided. First document editor application 1304 may be formula application 1106. Within first document editor application 1304, a second document editor application (sub-child document) 1306 is provided. Second document editor application 1306 may be function 1108. As function 1108 is a function of formula application 1106, both function 1108 and formula application 1106 may be provided or hosted by the same third party server. In an alternate embodiment, function 1108 and formula application 1106 may be hosted by different third party servers. In another embodiment, function 1108 may be hosted by a sub-domain of the server that hosts formula application 1106.

First document editor application 1304 may be related and provided within child frame 8012.

Referring back to step 1204 of FIG. 12, a change made to the percentage in the tax calculation is referred to as a mutation. As depicted by FIG. 13, a first mutation 1310 defines the first change made to spreadsheet document 1102 within child frame 8012, by formula application 1106. Prior to transmission of mutations to host server 101, mutations are tagged with an embed-specific, unique embed identifiers. The embed identifiers are distributed by host server 101 and uniquely identify which embedded document the mutation belongs to. A hierarchically topmost (root) document (e.g. spreadsheet document 1102) may have been assigned a well-known embed identifier, such as "root." Otherwise, the topmost document may be distributed an embed identifier no different than any other document.

First mutation 1310 is assigned, by device 103, an embed identifier #1000 associated with child frame 8012. For example, embed identifier #1000 may be associated with formula application 1106, which is provided by child frame 8012. Host server 101 may distribute, transmit, assign, or otherwise forward embed identifiers to all the frames.

In an embodiment, the embed identifier is substantially similar to the attach ID. The embed identifier may be a unique code that is communicated by host server 101. Similar to the attach ID, the embed identifier is mapped to corresponding frames and allowed domains. All mutations transmitted to host server 101 (via trusted frame 8002) may be identified by embed identifiers. In an embodiment, host server 101 may assign multiple, dedicated embed identifiers to a frame. The embed identifiers may be recycled and reused, as long as the changes to which frame is assigned which embed identifier are noted in the mapping. As described above, formula application 1106 may be a third party application (e.g. third party application 416) that is provided or hosted by third party server 104.

Referring again to FIG. 12, in step 1204, the user may create a second change to spreadsheet document 1102. For example, the user may wish to change or edit function 1108. The user may need to edit function 1108 in view of the changes made to formula 1106 (e.g. to reflect the jointly filing of taxes, described herein). Thus, the change to second document editor application 1306 is made by a second mutation 1316. Second mutation 1316 defining a second change made to spreadsheet document 1102 within sub-child frame 8022 is generated. Second mutation 1316 is assigned a unique embed identifier #1001 associated with sub-child frame 8022.

In an embodiment, a third mutation 1314 may be made within first document editor application 1304. The third mutation may be a change to formula application 1106. For example, suppose the user gets married and wants to calculate the tax advantages of filing taxes jointly. The user may change one or more variables within formula 1106 in order to calculate the taxes for filing jointly. The change in one or more variables may be reflected by third mutation 1314. In an embodiment, third mutation 1314 occurs within first document editor application 1304. Therefore, the same embed identifier #1000 is assigned to third mutation 1314 as is assigned to first mutation 1310. In an alternate embodiment, a different embed identifier or an embed identifier sharing at least some digits as assigned to the first mutation may be assigned to the third mutation.

In an embodiment, the user may wish to make a change to section of a portion of the pie chart in drawing 1112, within frame 1113 in FIG. 11. For example, should the user wish to graphically depict how much of his total taxes was paid in social security tax, the user may create a slice on the pie chart indicative of the social security tax. The change to spreadsheet document 1102 is made by a drawing application used to create drawing 1112 within frame 1113. In an embodiment, the drawing application may be third party application 516 which is provided or hosted by third party server 105. As depicted by FIG. 13, device 103 generates a fourth mutation 1312 that defines the change made to spreadsheet document 1102 by the drawing application. For example, a third document editor application (child document) 1308 is provided, which may be the drawing application. Fourth mutation 1312 is assigned a fourth embed identifier #2054 associated with frame 1113. As described above with respect to embed identifiers, the fourth embed identifier may be a unique code that is communicated by host server 101.

At step 1206, the first mutation and the first embed identifier and the second mutation and the second embed identifier are transmitted to a remote server. First mutation 1310 and first embed identifier #1000 and second mutation 1316 and second embed identifier #1001 are transmitted to host server 101 by device 103, via network 102. Specifically, first mutation 1310 and first embed identifier #1000 are communicated via child frame 8012 to trusted frame 8002. Second mutation 1316 and second embed identifier #1001 are communicated via sub-child frame 8022 to trusted frame 8022. Host server 101 then performs a verification process, as described above, to ensure allowed domains transmit embed identifiers. Specifically, a verification is made to verify that to ensure that corresponding mutations have been transmitted by allowed domains, via verification of the corresponding embed identifiers contained in the mutation, and checking the mapping.

As depicted by FIG. 14, host server 101, in memory 303, may store and maintain a changelog 1402. Changelog 1402 includes a history of all mutations. In an alternate embodiment, changelog 1402 may be maintained external to host server 101. A copy of changelog 1402 may be maintained at device 103, device 106 or elsewhere.

In an embodiment, spreadsheet application 1100 in FIG. 11 is a changelog-based editor application. Changelog-based editor applications may represent a document (e.g. spreadsheet document 1102) as an ordered log of mutations, each of which may be generated through a user action. Examples of mutations include typing or bolding a selection range. By replaying the changelog, it may be possible to reconstruct the document in any state (e.g. a current state or in any previous revision state).

At step 1208, a first instruction relating to the document and including the first embed identifier and a second instruction relating to the document and including the second embed identifier are received from the remote server. Host server 101 receives the mutations from device 103. After verifying that the mutations have been transmitted by allowed domains via verification of the embed identifiers and checking the mapping, as described above, host server 101 makes the changes contained in the mutations. For example, changes are made to formula application 1106 within child frame 8012 and changes are made to function 1108 within sub-child frame 8022, as requested by user device 103. Host server 101 transmits to device 103 a first instruction relating to spreadsheet document 1102, the first instruction includes the first embed identifier #1000. Host server transmits to device 103 a second instruction relating to spreadsheet document 1102, the second instruction includes the second embed identifier #1001.

Similarly, changes made by fourth mutation 1312 to drawing application containing drawing 1112 within frame 1113 and changes made by third mutation 1314 to formula application 1106 within child frame 8012 are transmitted by respective fourth instruction and third instruction. Each of fourth instruction and third instruction include fourth embed identifier #2054 and third embed identifier #1000, respectively.

In an embodiment, the instructions sent by host server 101 are forwarded by trusted frame 8002 to device 103. In this way, only secure and trusted instructions are received by device 103.

At step 1210, the first instruction, based on the first embed identifier, is transmitted by the device to the first frame. Device 103 receives the first instruction, and based on the first embed identifier #1000 recognizes that the first instruction is to be forwarded to child frame 8012. Therefore, device 103 transmits the first instruction to child frame 8012.

At step 1212, the second instruction, based on the second embed identifier, is transmitted by the device to the second frame. Device 103 receives the second instruction, and based on the second embed identifier #1001 recognizes that the second instruction is to be forwarded to sub-child frame 8022. Therefore, device 103 transmits the first instruction to sub-child frame 8022.

In an embodiment a batch mutation defines a plurality of changes made to spreadsheet document 1102 within child frame 8022. The batch mutation is assigned a third embed identifier associated with child frame 8022. The batch mutation and the third embed identifier is transmitted to host server 101. A batch instruction, based on the third embed identifier is transmitted by device 103, to child frame 8022. The third embed identifier may equivalent to the first embed identifier #1000.

In an embodiment, any user accessing spreadsheet document 1102 may embed one or more applications, functions, formulas, documents, spreadsheets, drawings, images, digital photographs, presentations, games, social network and/or news feeds, videos, multimedia, maps, charts, etc. into spreadsheet document 1102.

Host server 101 receives mutations after they pass through trusted frame 8002. In an embodiment, trusted frame 8002 may manipulate the mutations. For example, trusted frame 8002 may strip off data contained within the mutations that may create a security risk. Trusted frame may encapsulate the mutations prior to transmission to host server 101. Details regarding how the trusted frame transmits the mutations to the server are described in detail in U.S. patent application Ser. No. 13/224,479 filed Sep. 2, 2011; U.S. patent application Ser. No. 13/224,530 filed Sep. 2, 2011; U.S. patent application Ser. No. 13/224,573 filed Sep. 2, 2011; U.S. patent application Ser. No. 13/224,663 filed Sep. 2, 2011; U.S. patent application Ser. No. 13/224,769 filed Sep. 2, 2011; U.S. patent application Ser. No. 13/224,860 filed Sep. 2, 2011; U.S. patent application Ser. No. 13/297,762 filed Nov. 16, 2011; U.S. patent application Ser. No. 13/551,772 filed Jul. 18, 2012; U.S. patent application Ser. No. 13/551,859 filed Jul. 18, 2012; and U.S. patent application Ser. No. 13/591,851 filed Aug. 22, 2012, the contents of which are hereby incorporated herein by reference in their entirety.

Mutations Handled by the Server

Figure 15:
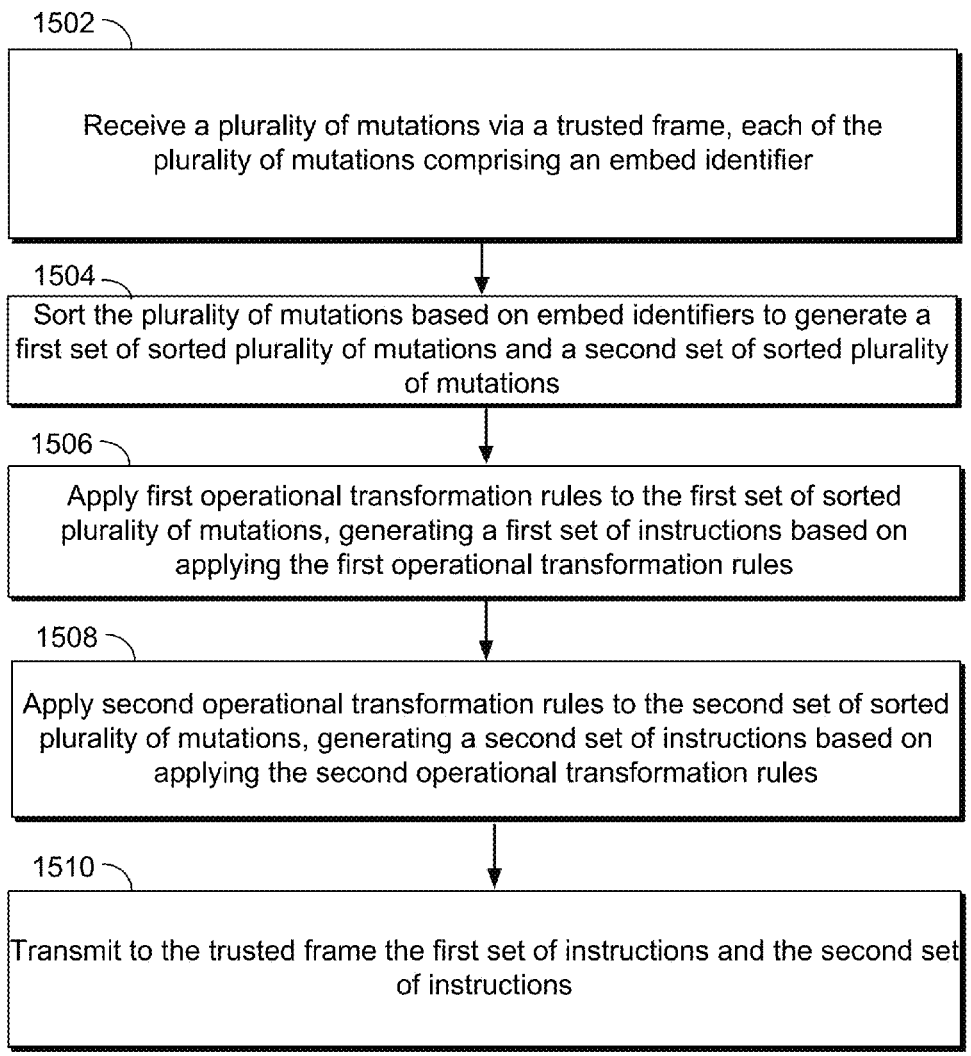
FIG. 15 is a flowchart of a method of handling mutations at a server, in accordance with an embodiment.
Figure 16:
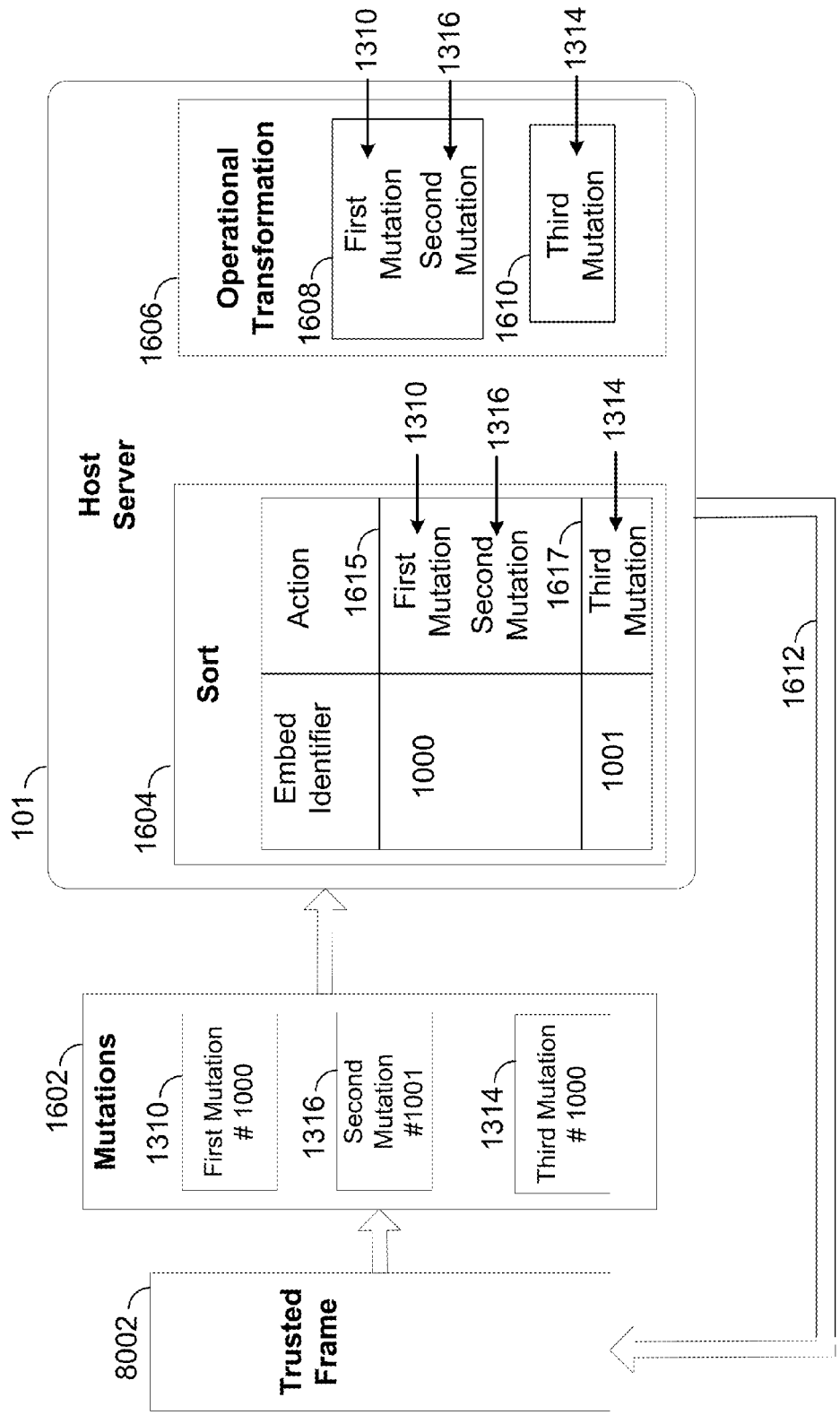
FIG. 16 shows communication between a trusted frame and a server, in accordance with an embodiment.

FIG. 15 depicts a flowchart of a method for handling mutations at a server, in accordance with an embodiment. At step 1502, a plurality of mutations are received via a trusted frame, each of the plurality of mutations include an embed identifier. As depicted by FIG. 16, multiple mutations 1602 are received via trusted frame 8002 at host server 101. Each of the mutations includes an embed identifier, as depicted by FIG. 16.

At step 1504, the plurality of mutations are sorted based on embed identifiers to generate a first set of sorted plurality of mutations and a second set of sorted plurality of mutations. Host server 101 sorts the plurality of mutations 1602 based on their embed identifiers to generate a first set of sorted plurality of mutations 1615 and a second set of sorted plurality of mutations 1617. As depicted by FIG. 16, host server 101 includes a sort chart 1604. Sort chart 1604 may be stored within memory 303, or elsewhere in host server 101. In an embodiment, sort chart 1604 may be stored external to host server 101, yet still accessible by host server 101.

Sort chart 1604 sorts through the received actions and lists the received actions based on embed identifiers. For example, should host server 101 receive first mutation 1310, second mutation 1316 and third mutation 1314, sort chart 1604 performs a sort to group all actions associated with each embed identifier. Two actions (e.g. mutations) contain the embed identifier #1000. These actions, first mutation 1310 and second mutation 1316, are sorted by sort chart 1604 and listed as being associated with embed identifier #1000. Third mutation 1314 contains the embed identifier #1001. Therefore, third mutation 1314 is listed in the chart as being associated with embed identifier #1001. If other mutations having the embed identifier #1001 are received by host server 101, sent via trusted frame 8002, these mutations will be sorted and listed with third mutation 1314. The mutations may be received by host server 101 in any order. In an embodiment, trusted frame 8002 transmits a batch of actions to host server 101 and allows host server 101 to perform the sort. In another embodiment, trusted frame 8002 may presort the actions before forwarding them to host server 101. Trusted frame 8002 may perform other functions to actions prior to submission to host server 101. For example, as described above, trusted frame 8002 may encapsulate the actions prior to submission.

At step 1506, first operational transformation rules are applied to the first set of sorted plurality of mutations, generating a first set of instructions based on applying the first operational transformation rules. As depicted by FIG. 16, host server 101 applies operational transformation 1606 to a first set of a plurality of mutations 1608. Specifically, a first set of operational transformation rules are applied to first set of a plurality of mutations 1608. A first set of instructions based on applying first set of operational transformation rules are generated by host server 101.

At step 1508, second operational transformation rules are applied to the second set of sorted plurality of mutations, generating a second set of instructions based on applying the second operational transformation rules. Host server 101 applies operational transformation 1606 to a second set of a plurality of mutations 1610. Specifically, a second set of operational transformation rules are applied to second set of a plurality of mutations 1610. A second set of instructions based on applying the second operational transformation rules are generated. Operational transformations are described, for example, in U.S. patent application Ser. No. 13/224,479 filed Sep. 2, 2011; U.S. patent application Ser. No. 13/224,530 filed Sep. 2, 2011; U.S. patent application Ser. No. 13/224,573 filed Sep. 2, 2011; U.S. patent application Ser. No. 13/224,663 filed Sep. 2, 2011; U.S. patent application Ser. No. 13/224,769 filed Sep. 2, 2011; U.S. patent application Ser. No. 13/224,860 filed Sep. 2, 2011; U.S. patent application Ser. No. 13/297,762 filed Nov. 16, 2011, the contents of which are incorporated herein by reference in their entirety.

The operational transformation process may be performed separately for each group of mutations (e.g. a group of mutations having the same embed identifier). By applying a set of operational transformation rules to a particular set of a plurality of mutations, conflicts mutations may be prevented. In an embodiment, the first set of operational transformation rules and the second set of operational transformation rules may be substantially similar or equivalent. In another embodiment, the first set of operational transformation rules may be different than the second set of operational transformation rules.

Actions in the form of mutation types may be defined and added to changelog 1402. In an embodiment, a number of mutations types may be minimized, as for each possible type pair of mutation, a set of operational transformation rules may be required.

At step 1510, the first set of instructions and the second set of instructions are transmitted to the trusted frame. Host server 101 transmits a first set of instructions and the second set of instructions to trusted frame 8002, as shown by arrow 1612.

In an embodiment, a set of instructions may include transformed mutations that are re-combined. The order in which the embed identifier groups are transmitted may not matter. However, it may be important to not re-order mutations having the same embed identifier. Additionally, in the embedding system, when mutations are transmitted to the host server or back to the user device, the mutations may be interleaved from different embed identifier groups arbitrarily. However, in an embodiment, it may be important to not re-order mutations within an embed group. For example: if a first embed identifier issued mutations "A" then "B", and a second embed identifier issued mutations "C" then "D", the following mutations could be sent: A, B, C, D or A, C, B, D or C, D, A, B or C, A, D, B. However, the mutations A, B, D, C (or in any other order where "B" comes before "A" or where "D" comes before "C") cannot be sent as the order of "C" and "D" is reordered.

Trusted frame 8002 then forwards a first set of instructions for applying the first operational transformation rules to child frame 8012, and a second set of instructions for applying the second operational transformation rules to sub-child frame 8022. Specifically, attach manager 8004 within trusted frame 8002 recognizes the embed identifier #1000 associated with child frame 8012. Therefore, as the first set of instructions include embed identifier #1000, attach manager 8004 forwards the first set of instructions to child frame 8012. Similarly, as the second set of instructions include embed identifier #1001, attach manager 8004 forwards the second set of instructions to sub-child frame 8022. In this way, only the frames which issue actions receive respective instructions to update all or a portion of the data contained within the frames. Furthermore, other frames (e.g. frame 1113) do not receive any instructions that do not pertain to them. Therefore, the instructions are securely transmitted to only the frames which generated the actions. Therefore, frames and document editors and other applications displayed within the frames are securely isolated from reading and/or modifying data in other frames. Moreover, a child frame is securely isolated from reading and/or modifying data in a sub-child frame.

In an embodiment, trusted frame 8002 receives transformed mutations in a form of a set of instructions from host server 101. Trusted frame 8002 may separate and filter the instructions by embed identifier and forward the proper instructions to the correct frame. As described above, secure communication may be established with the individual frames to ensure that no frame receives mutations that were intended for another frame. Secure isolation may be important where privacy is a concern.

When device 103 receives instructions from trusted frame 8004, device 103 redraws all or a portion of data within the child frame 8012 and sub-child frame 8022 based on the instructions. Device 103 then displays the changes made to spreadsheet document 1102 to a user employing device 103. If the user is viewing webpage 702 in FIG. 7, webpage 702 is refreshed to reflect the changes to spreadsheet document 1102. For example, the user may view the changes on a screen, monitor, output device, etc.

In an embodiment, all mutations received by host server 101 may be written into a mutation log and assigned a sequentially-increasing revision number. The mutation log may serve as the storage for the document (including all embedded sub-documents) and provide a single, consistent revision history of the document and all embedded documents. In this way, the embedded documents may be isolated from each other yet share a single revision history.

Snapshotting

When host server 101 initially loads, a snapshotting of spreadsheet document 1102 is performed. Host server 101 then groups mutations by embed identifiers, as described above. Host server 101 then performs snapshotting of each embedded document separately. For example, snapshotting of formula application 1106 in child frame 8012 is performed separately from snapshotting of function 1108 in sub-child frame 8022. Host server 101, after performing the snapshot, may then combine the snapshot of one or more embedded frames. However, in an embodiment, similar to the operational transformation process, mutations within an embed identifier group (having the same embed identifier) may not be re-ordered. Moreover, the embed identifier groups may be received in any order by host server 101.

In an embodiment, each embedded application may work on a different top-level document, having its own unique embed identifier, revision history, and communication channel.

In another embodiment, an embedded document's data (e.g. data of a document provided within a sub-child frame) may be included as a separate object in the root document (e.g. a document provided within a child frame). The embedded application may communicate with the root application rather than directly with the trusted frame.

Figure 17:
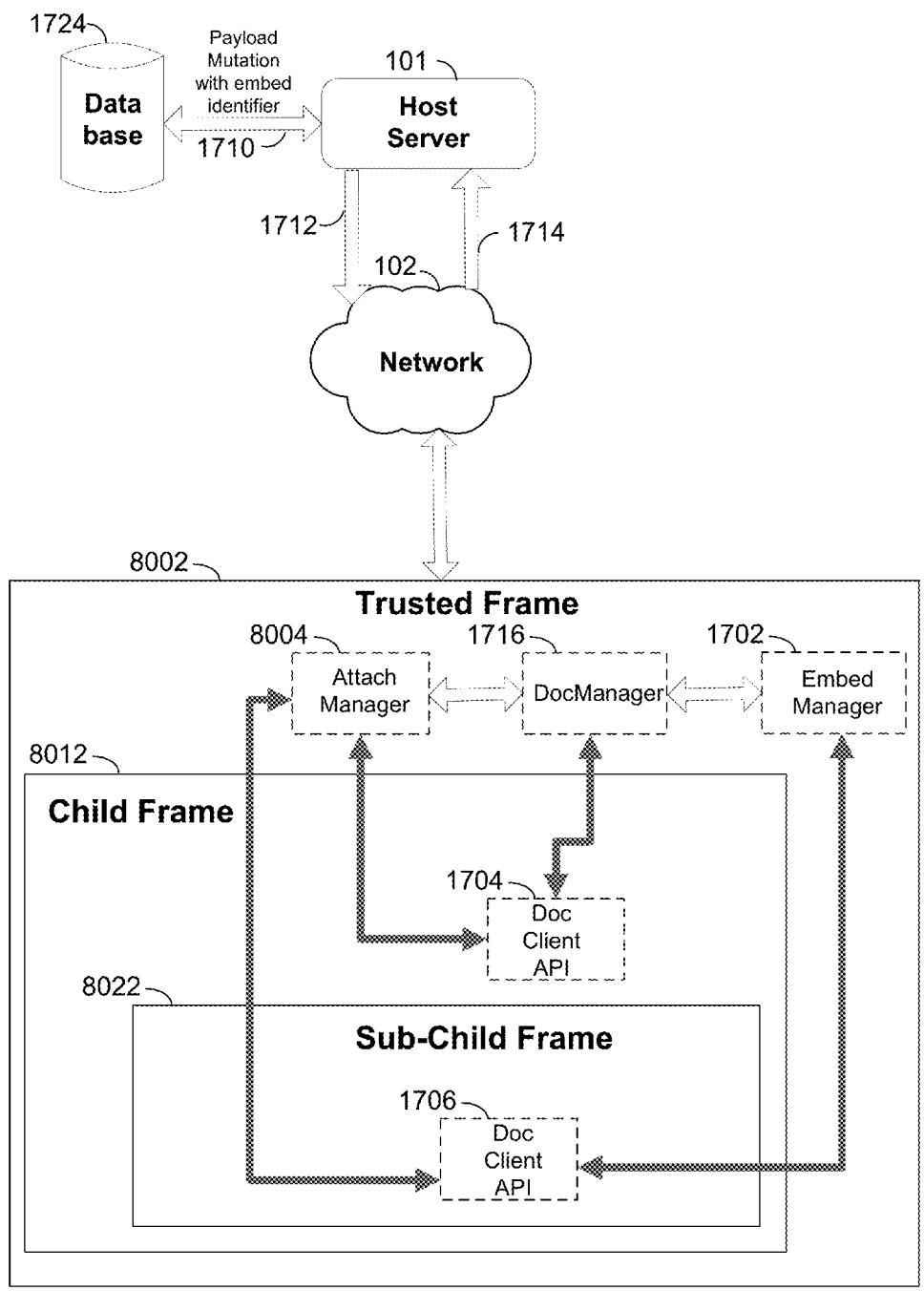
FIG. 17 shows communication between frames and a server, in accordance with an embodiment.

FIG. 17 depicts in detail communication between frames and host server 101, in accordance with an embodiment. As described above, trusted frame 8002 may communicate with one or more child frames. As depicted by FIG. 17, trusted frame 8002 includes an embed manager 1702. One embed manager 1702 may be created for each embedded document to handle communication with sub-child frame 8022. An in embodiment, a new embed manager may be added to trusted frame 8002 to provide cross-frame remote procedure call handlers to embed documents. Therefore, each embedded document may have a corresponding independent embed manager. Details regarding remote procedure calls are discussed in detail in U.S. patent application Ser. No. 13/591,851 filed Aug. 22, 2012 and U.S. patent application Ser. No. 13/591,734 filed Aug. 22, 2012, the contents of which are incorporated herein by reference in its entirety.

When host server 101 receives mutations, host server 101 communicates with a database 1724. Host server 101, receives and transmits data to database 1724, as indicated by arrow 1710. Host server 101 transmits payload mutation to database 1724. An embed identifier field including the embed identifier is added to the payload mutation.

Client API

In FIG. 17, each of child frame 8012 and sub-child frame 8022 include doc client API 1704 and doc client API 1706. API refers to the application programming interface. Doc client API 1704 and doc client API 1706 communicate with a DocManager 1716 inside trusted frame 8002. Communication between various components of trusted frame 8002 and doc client API 1704 and doc client API 1706 may be in a postmessage( ) form. Internal communication between attach manager 8004, DocManager 1716 and embed manager 1702 may be in a form of local communication.

Each doc client API may be updated to add methods that create and retrieve embedded documents. The new methods will return a new object, EmbeddedReference, which internally stores the embed identifier for the embedded document and can be added to the document data model (so that it may be persisted in the document state and sent to collaborators). The EmbeddedReference object will have a method to obtain an EmbeddedDocument widget which may handle loading the correct frame URL and sending RPCs to switch menus as appropriate.

Mutations communicated from trusted frame 8002 to host server 101, via network 102, as indicated by arrow 1714, include a proper embed identifier. Furthermore, instructions communicated from host server 101 to trusted frame 8002, via network 102, as indicated by arrow 1712, include a proper embed identifier. Communication in a direction indicated by arrow 1712 may be in a form of XHR. Communication in a direction indicated by arrow 1714 may be in a form of browser channel communication.

In an embodiment, new embedded documents may be added. In another embodiment, existing embedded documents may be re-added. In an embodiment, formula application 1106 may include a reference to an embed identifier of formula application 1106. Formula application 1106 may re-add any embedded documents when the child frame containing the formula application is reloaded. In another embodiment, embedded documents may be removed or deleted.

Security

As multiple applications may share the same trusted frame (and document, e.g. spreadsheet document 1102), mutations should be delivered to the correct frame and should not become intermixed between different embed identifiers. A frame may be prevented from attaching that is associated with different origin from the expected origin. This may prevent a frame from impersonating an embed identifier (from a different origin) and obtaining document contents. Furthermore, frames served from an untrusted domain (e.g. a domain other than the trusted frame's domain) cannot impersonate the trusted frame. Similarly, verification of the origin of the trusted frame may be made to prevent a child frame from attaching to anything other than the trusted frame, which may prevent applications from impersonating the trusted frame. Thus, child frames cannot impersonate other child frames. In an embodiment, only specifically allowed child frame domains can communicate with the trusted frame. Frames between the child and sub-child frame do not need to forward messages or implement specific functionality. Intermediate frames (those between the trusted frame and the child frame) do not need to be trusted.

As described above, mutations are separated based on embed identifiers. Because mutations are snapshotted separately and transformed separately, it may not be possible for a mutation in one embedded document to reference a mutation in a root document or another embedded document with a different embed identifier.

To provide extra security, host server 101 may require applications to be installed before they are used. Embedded documents may be required to meet the following policies:

Users may only create embedded documents for applications that they have installed.

AddEmbedAction (and associated client APIs) may fail if the application is not installed and the third-party application can display a message or redirect the user as appropriate.

Attempting to add an existing embed for an application that is not installed may also be disallowed. GetEmbedInfoAction may similarly fail if the application is not installed, and the third-party application should display a placeholder embed to inform the user and allow them to install the application.

If a developer attempts to circumvent the installation process by embedding an application's frame URL without using the AddEmbedAction or GetEmbedInfoAction RPCs, the embedded application frame will be unable to communicate with the trusted frame because the frame's attach ID will not be registered with the trusted attach manager.

In various embodiments, the method steps described herein, including the method steps described in FIGS. 6A, 6B, 12 and 15, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 6A, 6B, 12 and 15. Certain steps of the methods described herein, including one or more of the steps of FIGS. 6A, 6B, 12 and 15, may be performed by a server or by another processor in a network-based cloud-computing system. Certain steps of the methods described herein, including one or more of the steps of FIGS. 6A, 6B, 12 and 15, may be performed by a client computer in a network-based cloud computing system. The steps of the methods described herein, including one or more of the steps of FIGS. 6A, 6B, 12 and 15, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 6A, 6B, 12 and 15, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 18:
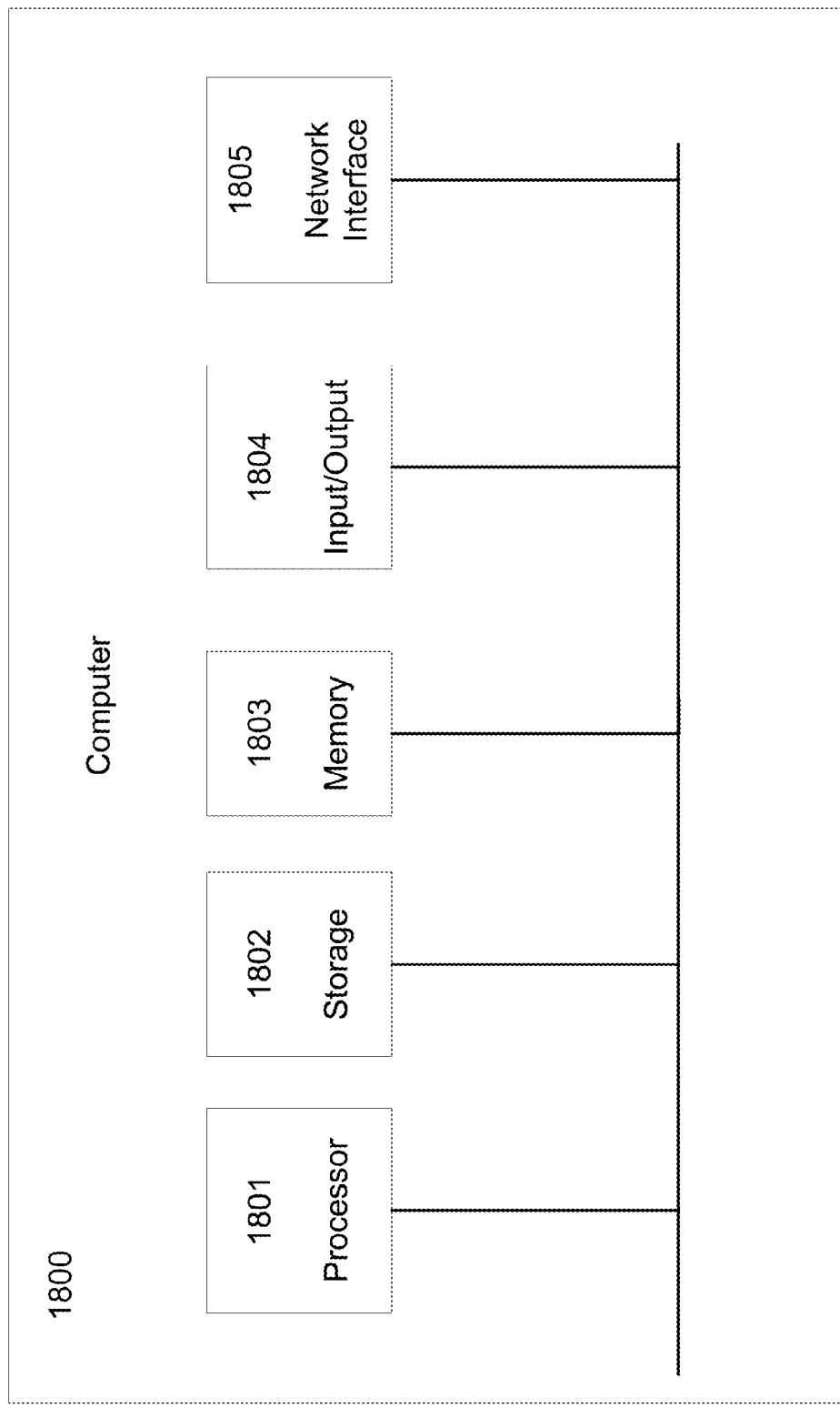
FIG. 18 shows components of a computer that may be used to implement the invention.

A high-level block diagram of an exemplary computer that may be used to implement systems, apparatus and methods described herein is illustrated in FIG. 18. Computer 1800 includes a processor 1801 operatively coupled to a data storage device 1802 and a memory 1803. Processor 1801 controls the overall operation of computer 1800 by executing computer program instructions that define such operations. The computer program instructions may be stored in data storage device 1802, or other computer readable medium, and loaded into memory 1803 when execution of the computer program instructions is desired. Thus, the method steps of FIGS. 6A, 6B, 12 and 15 can be defined by the computer program instructions stored in memory 1803 and/or data storage device 1802 and controlled by the processor 1801 executing the computer program instructions. For example, the computer program instructions can be implemented as computer executable code programmed by one skilled in the art to perform an algorithm defined by the method steps of FIGS. 6A, 6B, 12 and 15. Accordingly, by executing the computer program instructions, the processor 1801 executes an algorithm defined by the method steps of FIGS. 6A, 6B, 12 and 15. Computer 1800 also includes one or more network interfaces 1805 for communicating with other devices via a network. Computer 1800 also includes one or more input/output devices 1804 that enable user interaction with computer 1800 (e.g., display, keyboard, mouse, speakers, buttons, etc.).

Processor 1801 may include both general and special purpose microprocessors, and may be the sole processor or one of multiple processors of computer 1800. Processor 1801 may include one or more central processing units (CPUs), for example. Processor 1801, data storage device 1802, and/or memory 1803 may include, be supplemented by, or incorporated in, one or more application-specific integrated circuits (ASICs) and/or one or more field programmable gate lists (FPGAs).

Data storage device 1802 and memory 1803 each include a tangible non-transitory computer readable storage medium. Data storage device 1802, and memory 1803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1804 may include peripherals, such as a printer, scanner, display screen, etc. For example, input/output devices 1804 may include a display device such as a cathode ray tube (CRT) or liquid crystal display (LCD) monitor for displaying information to the user, a keyboard, and a pointing device such as a mouse or a trackball by which the user can provide input to computer 1800.

Any or all of the systems and apparatus discussed herein, including device 103, device 106, host server 101, third party server 104, third party server 105, browser 201, display 202, memory 203, database 204, processor 205, browser 211, display 212, memory 213, database 214, processor 215, processor 302, memory 303, application 316, application 312, processor 402, memory 403, third party application 416, third party application 426, processor 502, memory 503, third party application 516, and website 106, may be implemented using a computer such as computer 1800.

One skilled in the art will recognize that an implementation of an actual computer or computer system may have other structures and may contain other components as well, and that FIG. 18 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
embedding, by a device, in a first frame, a second frame;
receiving, a request from the second frame to establish communication with the first frame, wherein the request includes a domain of a third party application that is part of the second frame;
verifying, the domain of the third party application part of the second frame to be from a list of allowed origins;
establishing, communication between the first frame and the second frame based on the verifying;
generating a first mutation defining a first change made to a document within the first frame, the first mutation assigned a first embed identifier associated with the first frame, and a second mutation defining a second change made to the document within the second frame, the second mutation assigned a second embed identifier associated with the second frame;
receiving at the first frame, the second mutation and the second embed identifier, wherein the first frame verifies the second mutation being from the third party application of allowed origins;
transmitting the first mutation and the first embed identifier and the second mutation and the second embed identifier to a remote server;
receiving, from the remote server, a first instruction relating to the document and comprising the first embed identifier and a second instruction relating to the document and comprising the second embed identifier;
transmitting, by the device, to the first frame, the first instruction, based on the first embed identifier; and
transmitting, by the device, to the second frame, the second instruction, based on the second embed identifier.

2. The method of claim 1, wherein the first embed identifier is different than the second embed identifier.

3. The method of claim 1, wherein the first frame comprises a third party application.

4. The method of claim 1, wherein the second frame comprises a third party application.

5. The method of claim 4, wherein the first frame comprises a different third party application than the second frame.

6. The method of claim 1 further comprising:
generating a batch mutation defining a plurality of changes made to the document within the first frame, the batch mutation assigned a third embed identifier associated with the first frame;
transmitting the batch mutation and the third embed identifier to the remote server; and
transmitting, by the device, to the first frame, a batch instruction, based on the third embed identifier.

7. The method of claim 6, wherein the third embed identifier is equivalent to the first embed identifier.

8. The method of claim 1, wherein only those third party applications that belong to the domains contained in the list of allowed origins are permitted to communicate with the first frame.

9. The method of claim 1, wherein the first frame acts as an intermediary between the remote server and the device.

10. A non-transitory computer readable medium storing computer program instructions, which, when executed on a processor, cause the processor to perform a method comprising:
embedding, by a device, in a first frame, a second frame;
receiving, a request from the second frame to establish communication with the first frame, wherein the request includes a domain of a third party application that is part of the second frame;
verifying, the domain of the third party application part of the second frame to be from a list of allowed origins;
establishing, communication between the first frame and the second frame based on the verifying;
generating a first mutation defining a first change made to a document within the first frame, the first mutation assigned a first embed identifier associated with the first frame, and a second mutation defining a second change made to the document within the second frame, the second mutation assigned a second embed identifier associated with the second frame;
receiving at the first frame, the second mutation and the second embed identifier, wherein the first frame verifies the second mutation being from the third party application of allowed origins;
transmitting the first mutation and the first embed identifier and the second mutation and the second embed identifier to a remote server;
receiving, from the remote server, a first instruction relating to the document and comprising the first embed identifier and a second instruction relating to the document and comprising the second embed identifier;
transmitting, by the device, to the first frame, the first instruction, based on the first embed identifier; and
transmitting, by the device, to the second frame, the second instruction, based on the second embed identifier.

11. The non-transitory computer readable medium of claim 10, wherein the first embed identifier is different than the second embed identifier.

12. The non-transitory computer readable medium of claim 10, wherein the first frame comprises a third party application.

13. The non-transitory computer readable medium of claim 10, wherein the second frame comprises a third party application.

14. The non-transitory computer readable medium of claim 13, wherein the first frame comprises a different third party application than the second frame.

15. The non-transitory computer readable medium of claim 10 further comprising instructions defining the steps of:
generating a batch mutation defining a plurality of changes made to the document within the first frame, the batch mutation assigned a third embed identifier associated with the first frame;
transmitting the batch mutation and the third embed identifier to the remote server; and
transmitting, by the device, to the first frame, a batch instruction, based on the third embed identifier.

16. The non-transitory computer readable medium of claim 15, wherein the third embed identifier is equivalent to the first embed identifier.

17. The non-transitory computer readable medium storing computer program instructions of claim 10, wherein only those third party applications that belong to the domains contained in the list of allowed origins are permitted to communicate with the first frame.

18. The non-transitory computer readable medium storing computer program instructions of claim 10, wherein the first frame acts as an intermediary between the remote server and the device.

19. A method comprising:
receiving a plurality of mutations, via a trusted frame, each of the plurality of mutations comprising an embed identifier;
sorting the plurality of mutations based on embed identifiers to generate a first set of sorted plurality of mutations and a second set of sorted plurality of mutations, where the embed identifier identifies an originating frame for each of the plurality of mutations;
applying first operational transformation rules to the first set of sorted plurality of mutations, generating a first set of instructions based on applying the first operational transformation rules;
applying second operational transformation rules to the second set of sorted plurality of mutations, generating a second set of instructions based on applying the second operational transformation rules; and
transmitting to the trusted frame the first set of instructions and the second set of instructions.

20. The method of claim 19, wherein the trusted frame is in communication with a device.

21. The method of claim 19, wherein the trusted frame is in communication with a remote server.

22. The method of claim 21, wherein the trusted frame is entrusted by the remote server.

23. The method of claim 22, wherein the remote server assigns the embed identifier.

24. The method of claim 19, wherein the plurality of mutations are received in a batch mutation via the trusted frame.

* * * * *